United States Patent
Chu et al.

(10) Patent No.: US 8,480,508 B2
(45) Date of Patent: Jul. 9, 2013

(54) GOLF CLUB GRIP AND METHOD OF MAKING THE SAME

(76) Inventors: Hong-Sung Chu, Alhambra, CA (US); Chiung-Ling Wang Chu, Alhambra, CA (US); Leo Jaw, Taichung (TW)

(*) Notice: Subject to any disclaimer, the term of this patent is extended or adjusted under 35 U.S.C. 154(b) by 0 days.

(21) Appl. No.: 13/200,212

(22) Filed: Sep. 21, 2011

(65) Prior Publication Data

US 2013/0072320 A1 Mar. 21, 2013

(51) Int. Cl.
*A63B 53/14* (2006.01)

(52) U.S. Cl.
USPC ............................ 473/298; 473/300

(58) Field of Classification Search
USPC .................................. 473/298, 300
See application file for complete search history.

(56) References Cited

U.S. PATENT DOCUMENTS

| | | | |
|---|---|---|---|
| 3,311,375 A | 3/1967 | Onions | |
| 3,366,384 A | 1/1968 | Lamkin et al. | |
| 3,857,745 A | 12/1974 | Grausch et al. | |
| 6,656,057 B2 | 12/2003 | Manual et al. | |
| 6,857,971 B2 | 2/2005 | Huang | |
| 6,908,400 B2 * | 6/2005 | Chu et al. | 473/303 |
| 7,232,378 B2 * | 6/2007 | Jaw | 473/300 |
| 7,470,199 B2 | 12/2008 | Huang | |
| 7,491,133 B2 | 2/2009 | Huang | |
| 7,527,564 B2 | 5/2009 | Huang | |
| 7,585,230 B2 * | 9/2009 | Huang | 473/300 |
| 8,123,627 B2 | 2/2012 | Huang | |
| 2005/0209017 A1 | 9/2005 | Chu et al. | |
| 2009/0258721 A1 | 10/2009 | Huang | |
| 2009/0260189 A1 * | 10/2009 | Jaw | 16/421 |
| 2011/0077100 A1 | 3/2011 | Huang | |
| 2011/0111880 A1 | 5/2011 | Chu et al. | |
| 2013/0029776 A1 | 1/2013 | Huang | |

FOREIGN PATENT DOCUMENTS

CN 201832375 U 5/2011

OTHER PUBLICATIONS

Summons of U.S. Distric Court, Central District of California, Civil Action No. SACV06-66 DOC (MLGx) *Winn, Inc.* and *Ben Huang* v. *Compgrip USA Corp.* and *Hong-Sung Chu* dated Jan. 24, 2006.
Complaint for Patent Infringment and Demand for Jury Trial of Plaintiffs Winn, Inc. and Ben Huang filed Jan. 24, 2006.
Answer and counter claim of Defendents Compgrip USA Corp. and Hong-Sung Chu filed Mar. 8, 2006.
First Amended answer & counter claim of Defendents Compgrip USA Corp. and Hong-Sung Chu filed Mar. 31, 2006.

(Continued)

*Primary Examiner* — Michael Dennis

(57) ABSTRACT

A golf club grip comprises a resilient inner sleeve, a single sheet, an axial seam strip, and a combination of adhesives. The single sheet is wrapped around and adhered on to the resilient inner sleeve's body and has its top and bottom circumferential margins respectively over the resilient inner sleeve's cap underside edge and retaining sidewall edge, and two axial margins forming an axial gap along the length of the resilient inner sleeve's body. The combination of adhesives includes a pressure sensitive adhesive and a structural adhesive. The pressure sensitive adhesive is used to adhere the single sheet onto the resilient inner sleeve's body. The structural adhesive is applied in the axial gap covered with the axial seam strip to form an axial seam structure. The single sheet can be a leather/foam single sheet to provide the golf club grip with a soft and cushion feel for the user.

55 Claims, 25 Drawing Sheets

OTHER PUBLICATIONS

The May 5, 2006 opinion of Philip H Haymand concerning alleged infringement of the U.S. patent 6,857,971 not inclueded the exhibits referenced in this opinion. [information marked confidential—AEO] Relevant page appear at p. 25.

Compgrip USA Corp's and Hong-Sung Chu's response to Winn, Inc's and Ben Huang's First set of Interrogatories (1-14). filed Aug. 2, 2006 Case #SACV06-66 DOC (MLGx) [information marked confidential-AEO]. Relevant pages appear at pp. 6, 7, 8.

Compgrip USA Corp's and Hong-Sung Chu's Supplemental Response to Winn, Inc's and Ben Huang's First set of Interrogatories (1-14). [information marked confidential—AEO] filed Aug. 29, 2006. Relevant pages appear at pp. 6, 7, 8.

Winn,Inc.'s and Ben Huang's Response to Compgrip USA Corp.'s and Hong-Sung Chu's First set of Interrogatories (Nos. 1-18). filed Aug. 29, 2006. Case #SACV06-66DOC(MLGx) Relevant pages appear at pp. 3, 4.

Minutes regarding Order on Plaintiff's motion for [partial] summary judgment dated Apr. 23, 2007 (case#SACV06-66-VBF(MLGx)) Relevant pages appear at pp. 7 to 10.

Corrected Request for Inter Partes Reexamination of U.S. Patent No. 6,857,971 issued to Ben Huang, filed by Hong-Sung Chu and Compgrip USA Corp. filed Apr. 23, 2007, assigned U.S. Appl. No. 95/000,234.

Final Consent Judgment and Permanent Injunction dated Jul. 13, 2007. (Case #SACV06-66-VBF (MLGx)).Relevant pages appear at pp. 1, 2. not included the exhibits in this document.

Order Granting Request Inter Partes Reexamination, dated Jul. 16, 2007 (U.S. Appl. No. 95/000,234).

U.S. Appl. No. 60/572,604, filed May 19, 2004, Huang.

U.S. Appl. No. 13/304,764 first office action dated Feb. 12, 2013.

* cited by examiner

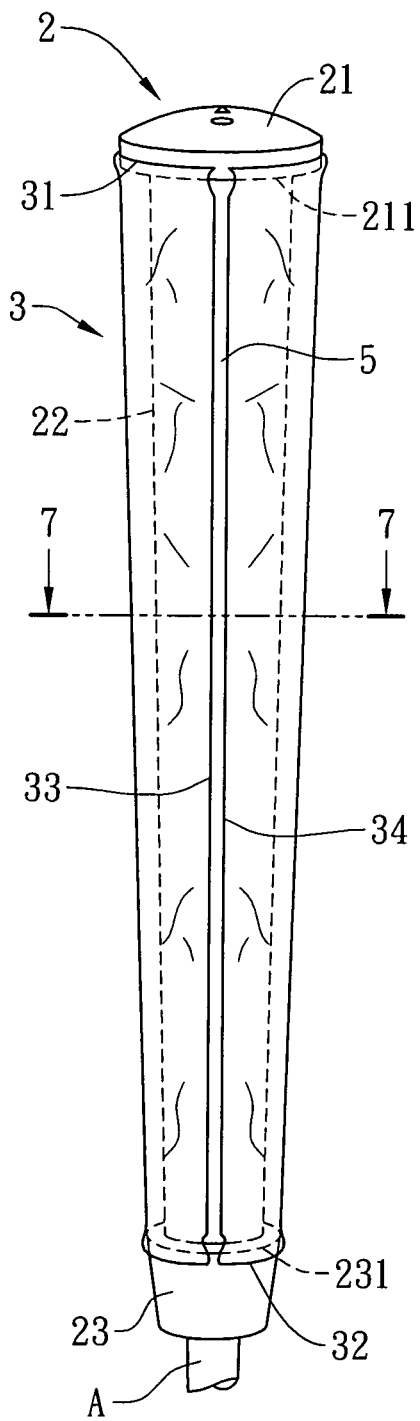
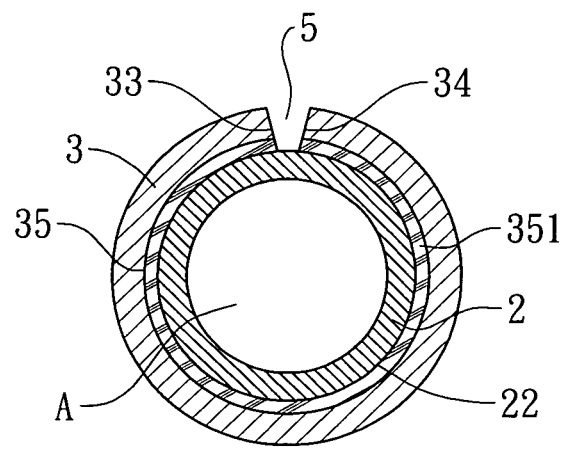
Fig. 7
Fig. 6

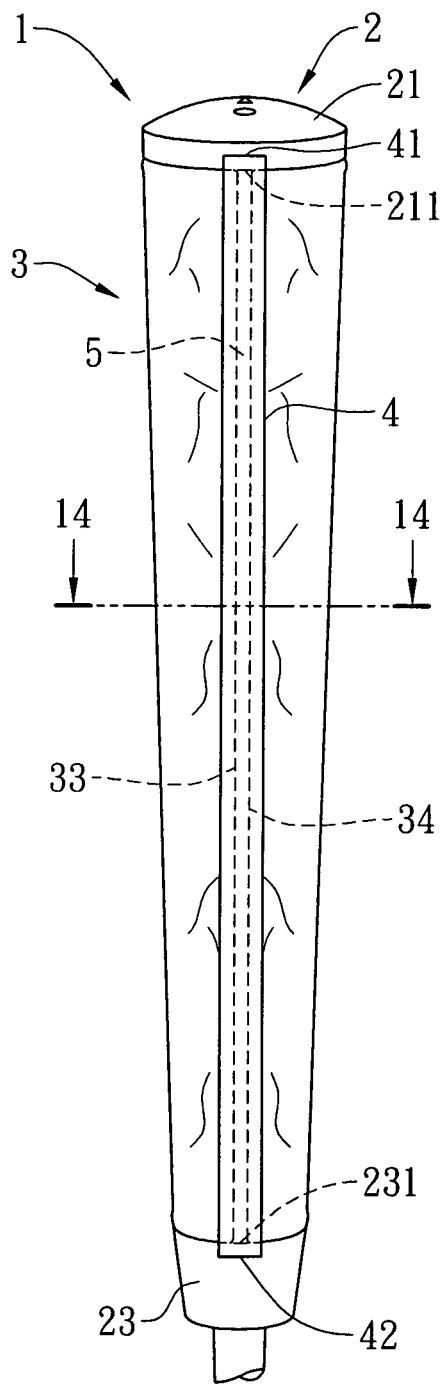
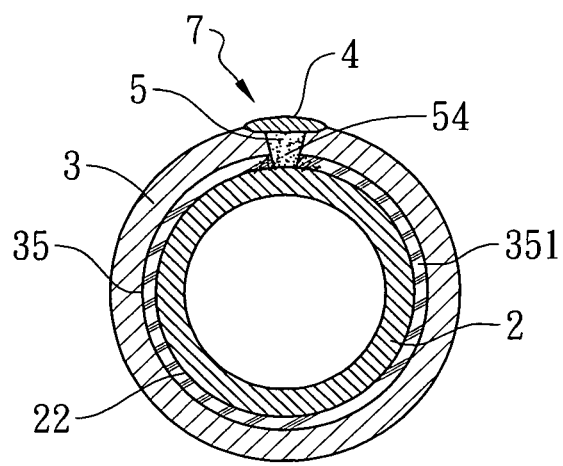
Fig. 14
Fig. 13

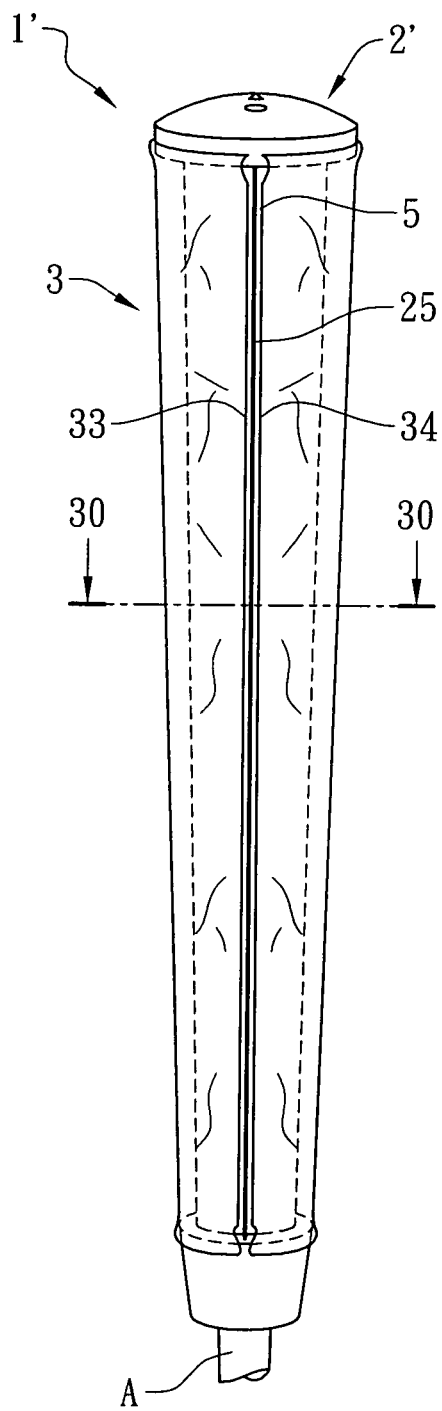
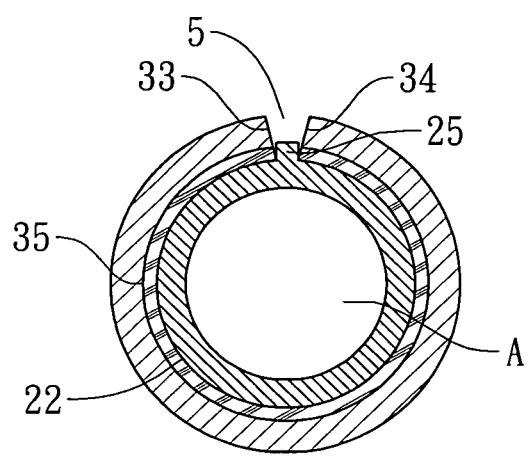
Fig. 29
Fig. 30

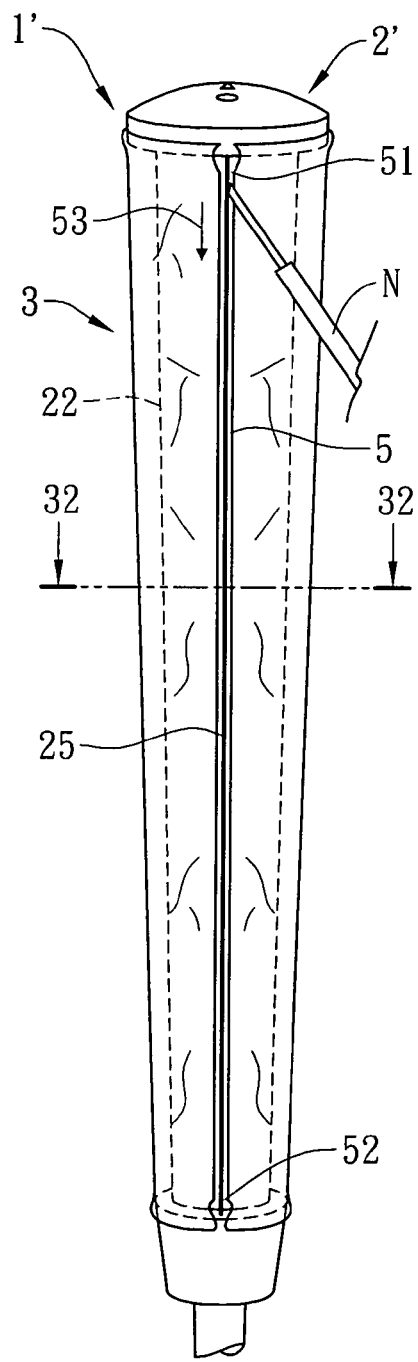
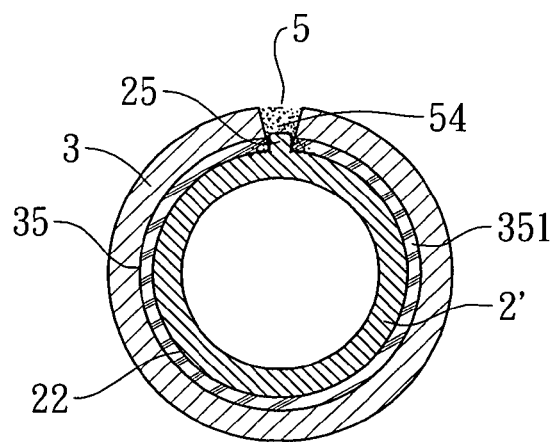
Fig. 32
Fig. 31

GOLF CLUB GRIP AND METHOD OF MAKING THE SAME

CROSS-REFERENCE TO RELATED APPLICATION

Not applicable.

BACKGROUND OF THE INVENTION

1. Field of the Invention

The invention is for a single anti-slip sheet golf club grip that has a stronger binding strength at its axial seam structure, an easier and faster fabrication with less mess and cleaning up, and also provides a finishing for good production rate.

2. Description of the Related Art

The Applicants Hong-Sung Chu and Chiung-Ling Wang Chu have developed an axial seam structure strong enough to hold a single natural leather sheet's two axial margins together and enhance the expansion capacity of the grip in an effort not only to ease installation but also to increase the maximum grip size attainable (U.S. patent application Ser. No. 12/590,506, filed on Nov. 9, 2009). But when its single sheet is less stretchable and the golf grip is mounted onto the larger end of the golf club shaft, the axial gap at its axial seam structure will be widely opened, therefore, weakening its axial seam strip, even though its axial seam strip is still holding two axial margins of its single anti-slip sheet. And during its fabrication process of wrapping and adhering its single sheet onto the sleeve body of its resilient inner sleeve with high adhesive cement such as polychloroprene adhesive, it is messy and takes more time to dry before wrapping and adhering.

SUMMARY OF THE INVENTION

The Applicants have developed a single anti-slip sheet golf club grip to solve the problems mentioned above.

It is an object of the present invention to provide a single anti-slip sheet golf club grip to have stronger binding strength at its axial seam structure.

It is another object of the present invention to fabricate the single anti-slip golf club grip easier and faster with less mess and clean up.

It is still another object of the present invention to have a finishing that improves the good production rate.

It is still another object of this invention to provide a golf club grip that has a soft and cushion feel for user gripping the single leather sheet golf club grip mounted onto the larger end of the golf club shaft.

According to the first two aspects of this invention, a single anti-slip sheet golf club grip includes a resilient inner sleeve, a single anti-slip sheet, an axial seam strip, and a combination of adhesives.

This combination of adhesives includes a structural adhesive and a Pressure Sensitive Adhesive (hereafter called PSA). The structural adhesive, as used herein, means an adhesive that hardens via a process of evaporation of solvent (for example, PU glue) or of chemical reaction (such as super glue or Cyanoacrylate) to form a permanent bond. The PSA, as used herein, means an adhesive forming a bond simply by the application of light pressure to combine the adhesive with the adhered.

The resilient inner sleeve has a cap at its top end, a protective rim at its bottom open end, and a tubular sleeve body between the cap and the protective rim. To fabricate the golf club grip of the present invention, the single anti-slip sheet is wrapped and adhered onto the tubular sleeve body with the PSA adhesive to form an axial gap between two axial margins of the single anti-slip sheet.

The structural adhesive is applied and filled in the axial gap to permanently bond the two axial margins of the single anti-slip sheet and the tubular sleeve body together.

The use of the PSA adhesive to adhere the single anti-slip sheet onto the tubular sleeve body makes the assembly process of the single anti-slip sheet golf club grip easier and faster with less mess and cleaning up.

The use of the structural adhesive (such as Cyanoacrylate) applied in the axial gap will enhance the binding strength of the axial seam structure.

According to another aspect of this invention, the single anti-slip sheet's dimension and the axial seam strip's axial length are predetermined in such a way that the top and bottom margins of the single anti-slip sheet and the first, second ends of the axial seam strip can be curved respectively to form four curved finishing respectively abutting against or near to the cap and the protective rim. These four finishing improve the appearance of the golf club grip and increase the good production rate in manufacturing.

Still according to another aspect of the present invention, the single anti-slip sheet can be modified into a leather/foam single sheet having a natural leather sheet as an outer layer and a closed-cell foam material sheet as a base layer to form a leather/foam single sheet golf club grip. Having the closed-cell foam sheet base layer, the leather/foam single sheet golf club grip provides a soft and cushion feel for the user after it is mounted onto the larger end of the golf club shaft.

BRIEF DESCRIPTION OF THE DRAWINGS

Other features and advantages of the present invention will become apparent in the following detailed description of the preferred embodiments with reference to the accompanying drawings, of which:

FIG. 6 is a back side prospective view of the first embodiment of the present invention with an axial gap during the assembly process.

FIG. 7 is a cross sectional view on the line 7-7 of FIG. 6.

FIG. 13 illustrates a step of sealing axial seam strip in the first embodiment's assembly process.

FIG. 14 is a cross sectional view of line 14-14 of FIG. 13.

FIG. 29 illustrates another wrapping step of the third embodiment's assembly process.

FIG. 30 is a cross sectional view of line 30-30 of FIG. 29.

FIG. 31 illustrates a step of applying the structural adhesive in the third embodiment's assembly process.

FIG. 32 is a cross sectional view of line 32-32 of FIG. 31.

DETAILED DESCRIPTION OF THE PREFERRED EMBODIMENTS

Figure 1:
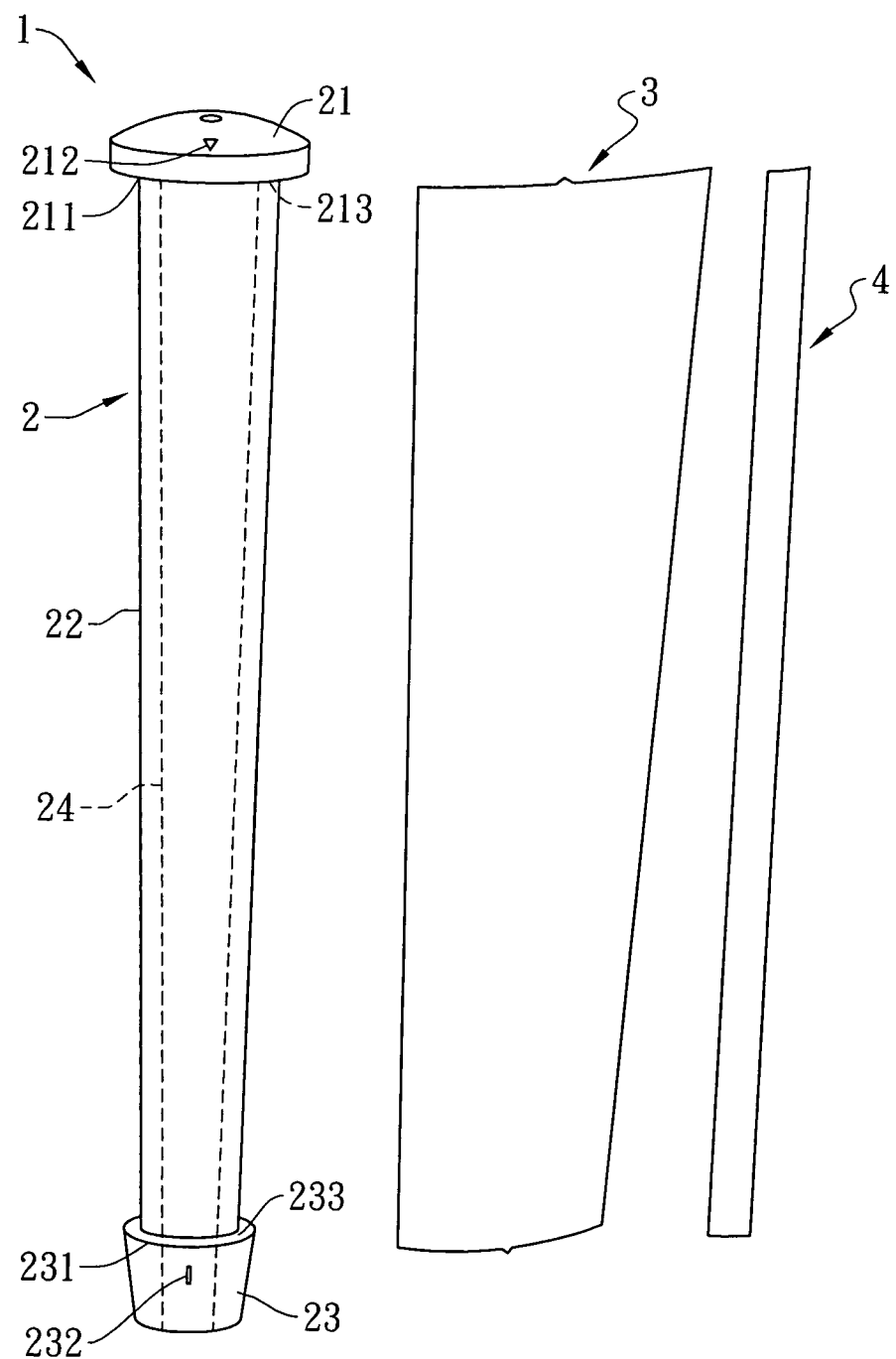
FIG. 1 is an exploded view of a first embodiment of the present invention.

The present invention will be illustrated from FIGS. 1 to 44, wherein the same elements are represented with the same reference number.

Referring to FIGS. 1 to 17, a first embodiment of the present invention is a single anti-slip sheet golf club grip 1 which is mountable onto the larger rear end of a golf club shaft to make a golf club. The single anti-slip sheet golf club grip 1 includes a resilient inner sleeve 2, a single anti-slip sheet 3, an axial seam strip 4 (shown in FIG. 1), and a combination of adhesives 54, 351.

The resilient inner sleeve 2 is made out of the expandable polymeric materials selected from a group of natural rubber, rubber compound, thermoplastic elastomer (TPE), thermoplastic rubber (TPR), any suitable plastic, and closed-cell foams of plastic or rubber. It is formed through a moulding process. Referring to FIG. 1, the resilient inner sleeve 2 includes a tubular sleeve body 22 which is circular in cross-section throughout its length and tapered in shape, a cap projecting radially from the larger top end of the sleeve body 22 and closed with a vent hole, a protective rim 23 projecting radially from smaller end tip of the sleeve body 22 with an opening, a cavity 24 configured to receive the larger end of the golf club shaft, two central marks 212, 232 located respectively on the cap 21 and the protective rim 23, an annular flat cap underside 213 connected to the sleeve body 22 and facing towards the protective rim 23, a cap underside edge 211 at the distal end of the cap underside 213, an annular flat retaining sidewall 233 connected to the sleeve body 22 and facing towards the cap 21, an retaining sidewall edge 231 at the distal end of the retaining sidewall 233.

Figure 2:
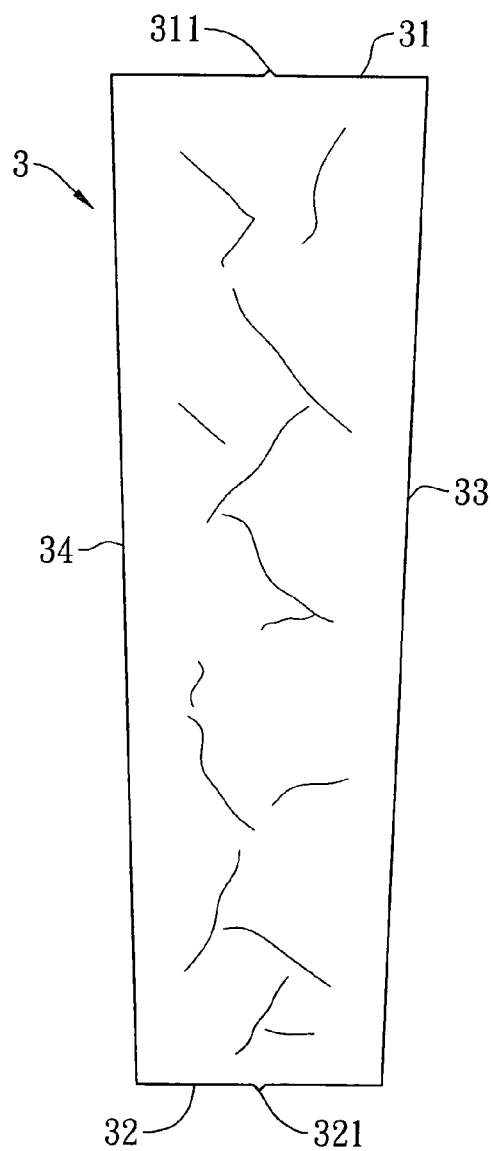
FIG. 2 is a front side prospective view of the single anti-slip sheet of the first embodiment.

The single anti-slip sheet 3 is made out of a sheeting material which may be synthetic leather, PU (Polyurethane) leather, PU wet type leather, PU/foam leather, natural leather, leather/foam layered material, and is formed by tailoring the sheeting materials into an elongated trapezoid shape. Referring to FIG. 2, the single anti-slip sheet 3 has a top circumferential margin 31, a bottom circumferential margin 32, two equal length long axial margins 33, 34 interconnecting respectively with the top circumferential margin 31 and the bottom circumferential margin 32, and two central marks 311, 321 are respectively on the top circumferential margin 31 and the bottom circumferential margin 32, and a predetermined dimension and shape. It has a thickness of about 0.6 mm to 2 mm.

The determined dimension and shape of the single anti-slip sheet 3 does not correspond to the dimension and shape of the inner sleeve body 22's outer surface in such a way that the length between the top circumferential margin 31 and the bottom circumferential margin 32 is about 1 mm to 4 mm longer than the axial length of the tubular sleeve body 22 between the cap 21 and the protective rim 23. Its dimension is longitudinally narrower than the dimension of the tubular sleeve body 22's outer surface so as to form an axial gap 5 between two axial margins 33, 34 during a wrapping step in an assembly process of forming golf club grip 1 of the present invention (detailed later).

The axial seam strip 4 is made out of the materials such as Polyurethane or natural leather. It has a width of about 4 mm to 8 mm (preferably 5 mm to 6 mm), a length of about 1 mm to 4 mm longer than the axial length of the tubular sleeve body 22 between the cap 21 and the protective rim 23, and a thickness from 0.2 mm to 0.6 mm (preferably 0.4 mm). The backside of the axial seam strip is coated with a cement such as hot melt adhesive and protected with a releasing paper (not shown).

The combination of adhesives includes the structural adhesive (such as PU glue, super glue or Cyanoacrylate 54, preferably Cyanoacrylate 54) and the PSA 351. The single anti-slip sheet 3 is coated with the PSA 351 on its back side 35 and this PSA 351 is protected with a releasing paper 352 (referring to FIG. 3); or the single anti-slip sheet 3 is covered and adhered with a PSA double-sided tape which has one side combine the PSA with the back side 35 of the single anti-slip sheet 3 and one side's PSA 351 be protected with a releasing paper (not shown). The PSA double-sided tape is a type of double-sided tape of which the adhesive is made of the PSA. The Cyanoacrylate 54 is applied in the axial gap 5 during the assembly process below.

Figure 4:
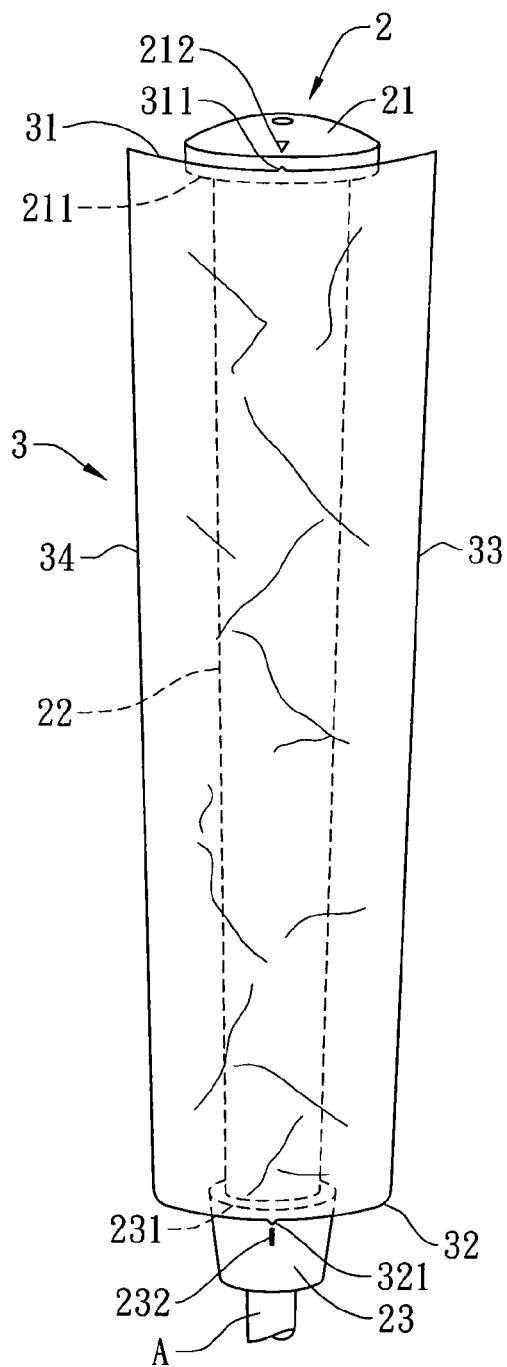
FIG. 4 illustrates a wrapping step of the first embodiment's assembly process.

In assembly, the resilient inner sleeve 2 is mounted onto a supporting rod "A". The releasing paper 352 is peeling off from the back side 35 of the single anti-slip sheet 3 to expose the PSA 351. Referring to FIG. 4, the single anti-slip sheet 3 is aligned with the central marks 212/311 and 232/321 respectively, then set and pressed onto the sleeve body 22. The top circumferential margin 31 is over the cap underside edge 211 of the cap 21 with a length of about 0.5 mm to 2 mm, and preferably 2 mm; meanwhile, the bottom circumferential margin 32 is over the retaining sidewall edge 231 of the protective rim 23 with the length of about 0.5 mm to 2 mm, and preferably 2 mm.

Figure 5:
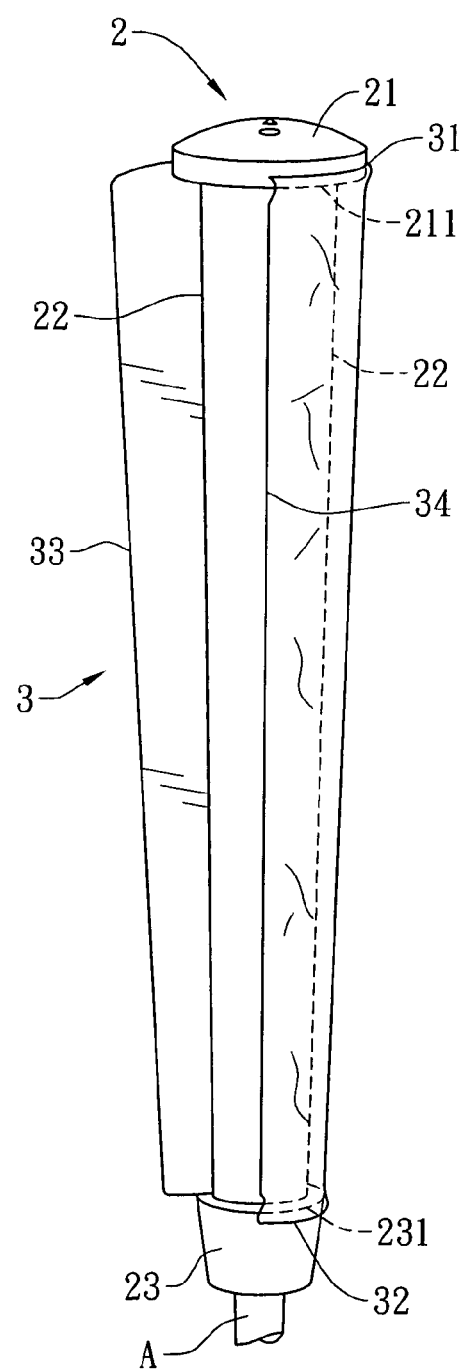
FIG. 5 illustrates another wrapping step of the first embodiment's assembly process.

Referring to FIGS. 5 to 7, the single anti-slip sheet 3 is wrapped around and adhered onto the sleeve body 22. The axial gap 5 is formed with a width of about 0.2 mm to 0.8 mm between two axial margins 33, 34 from said cap 21 to said protective rim 23.

Figure 8:
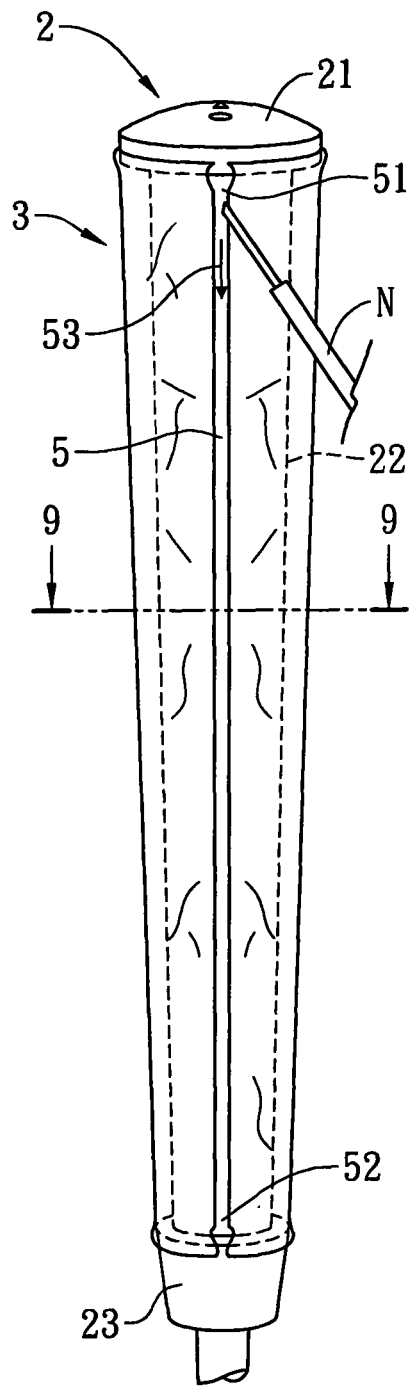
FIG. 8 illustrates a step of applying a structural adhesive in the first embodiment's assembly process.
Figure 9:
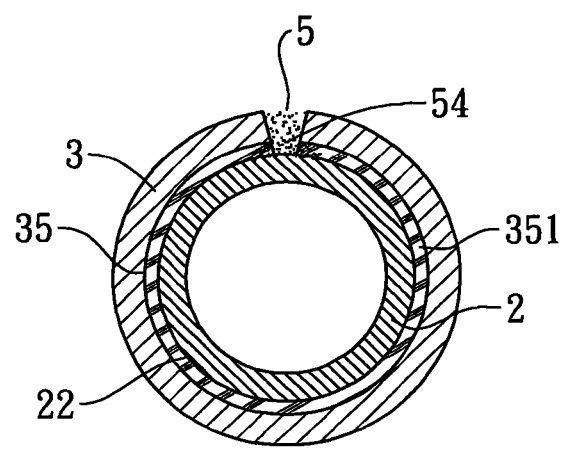
FIG. 9 is a cross sectional view of line 9-9 of FIG. 8.

Referring to FIGS. 8, 9, with a needle-like tube applicator "N", the Cyanoacrylate (super glue) 54 is applied in the axial gap 5 axially from a first point 51 to a second point 52. The first point 51 is about 1 mm to 3 mm away from the cap 21 toward the protective rim 23, and the second point 52 is about 1 mm to 3 mm away from the protective rim 23 toward the cap 21.

Figure 10:
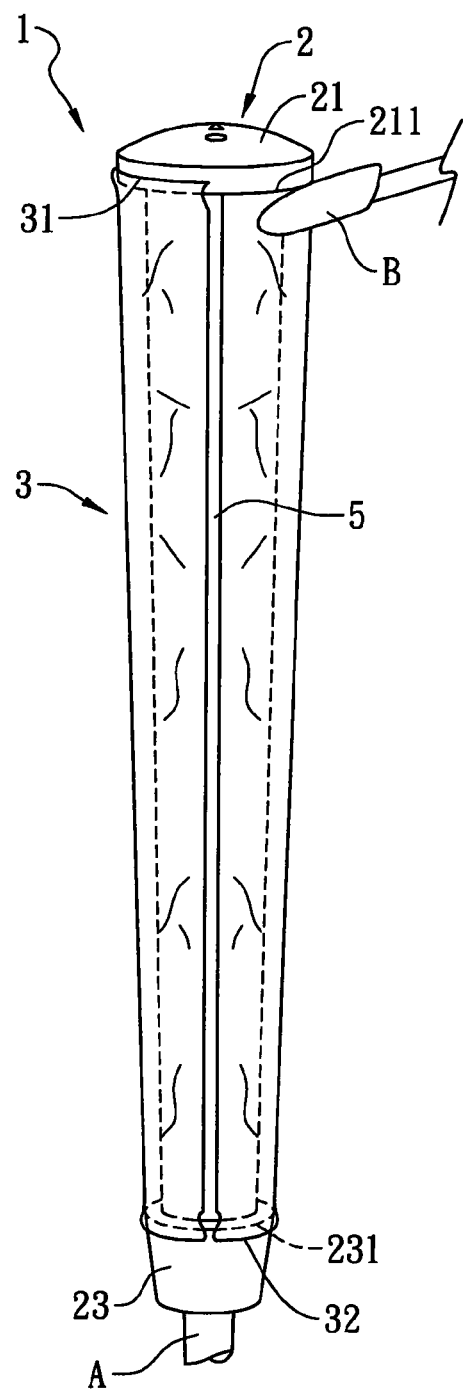
FIG. 10 illustrates a first finishing step of the first embodiment's assembly process.
Figure 12:
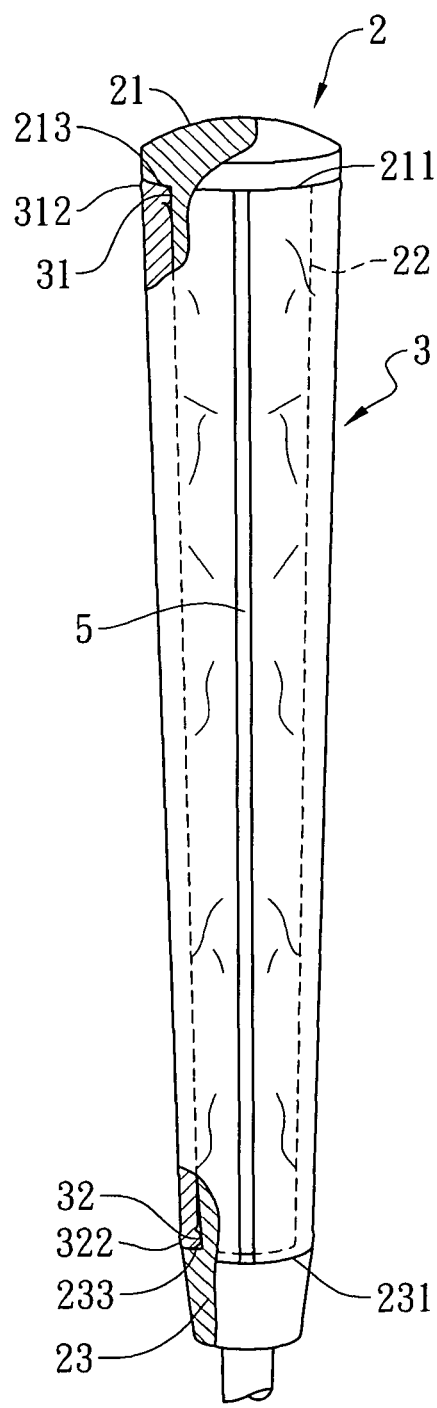
FIG. 12 is a partial sectional view of the first embodiment after the second finishing step of assembly process.

Referring to FIGS. 10 and 12, a first finishing process is to utilize a smooth, hard plate "B" like a butter knife blade to pull and curve the top circumferential margin 31 inwardly underneath the flat cap underside 213 from the axial aap 5's position around the sleeve body 22 to form a first finishing 312. The first finishing 312 is a curved top circumferential edge abutting against or near to the flat cap underside 213 (shown in FIG. 12).

Figure 11:
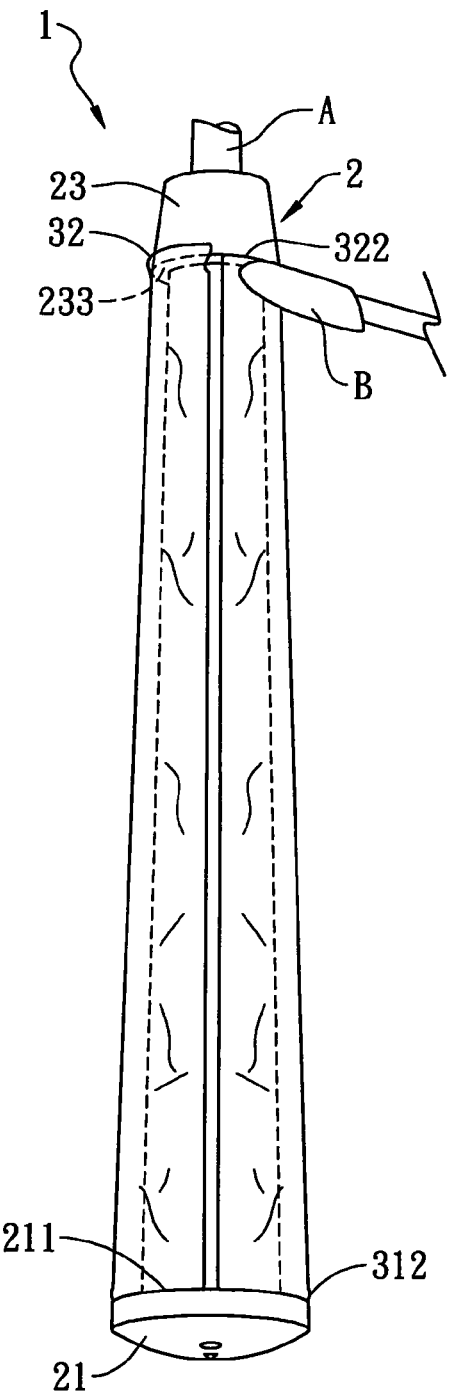
FIG. 11 illustrates a second finishing step of the first embodiment's assembly process.

The assembling golf club grip 1 with rod "A" is flipped over to form a second finishing 322 along the flat retaining sidewall 233 (shown in FIG. 11). The second finishing process is also to utilize a smooth, hard plate "B" like a butter knife blade to pull and curve the bottom circumferential margin 32 inwardly underneath the flat retaining sidewall 213 from the axial gap 5's position around the tubular sleeve body to form a second finishing 322. The second finishing 322 is formed to be a curved bottom circumferential edge abutting against or near to the flat retaining sidewall 233 of the protective rim 23 (shown in FIG. 12).

The axial seam strip 4, after its releasing paper is peeled off, is placed on top of the axial gap 5 through the length of the two axial margins 33, 34, and then (referring to FIG. 13), the axial seam strip 4 is cut at its predetermined length to form a strip top end 41 and a strip bottom end 42. The strip top end 41 is over the cap underside edge 211 for about 0.5 mm to 2 mm, and preferably 2 mm. The strip bottom end 42 is over the retaining sidewall edge 231 of the protective rim 23 for about 0.5 mm to 2 mm, and preferably 2 mm.

The axial seam strip 4, through a high frequency and heat press process and with a heated die (not shown), bonds two axial margins 33,34 axially along their length and covers the axial gap 5 to form an axial seam structure shown in FIGS. 13, 14.

Figure 15:
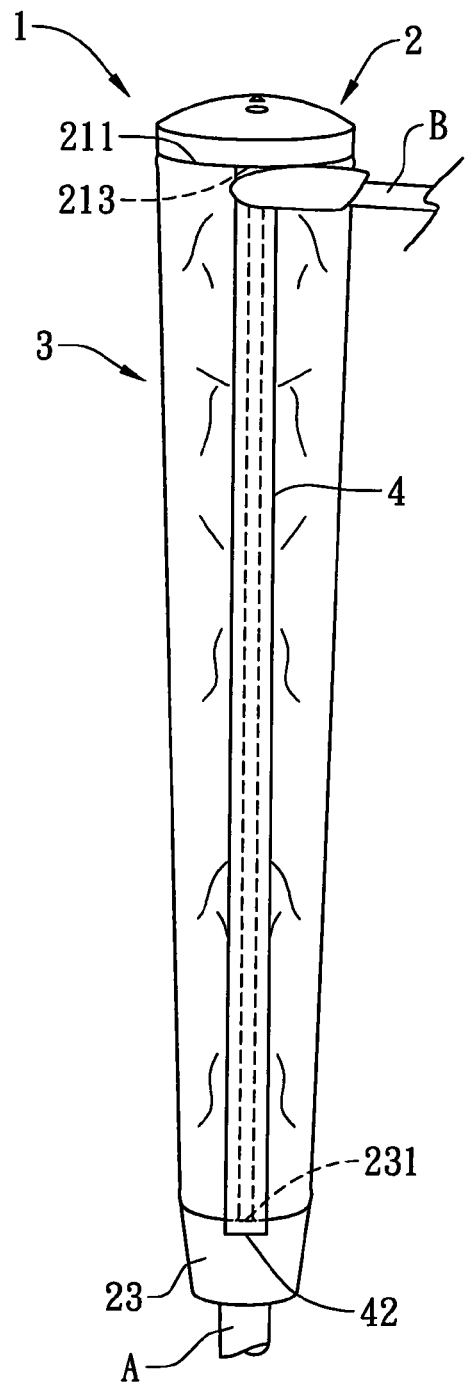
FIG. 15 illustrates a third finishing step of the first embodiment's assembly process.
Figure 17:
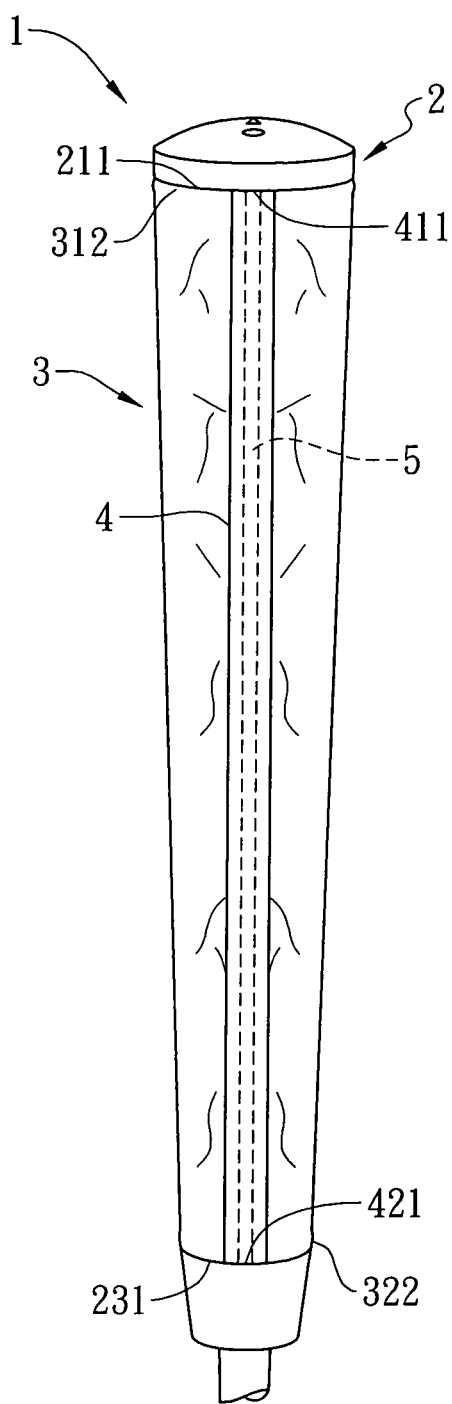
FIG. 17 is a prospective view of the first embodiment of the present invention.

For finishing the top end 41 of the axial seam strip 4, the smooth and hard plate "B", like a butter knife blade, is used for a third finishing process to pull and curve the strip top end 41 inwardly underneath the flat cap underside 213 to form a third finishing 411 (referring to FIGS. 15 and 17).

Figure 16:
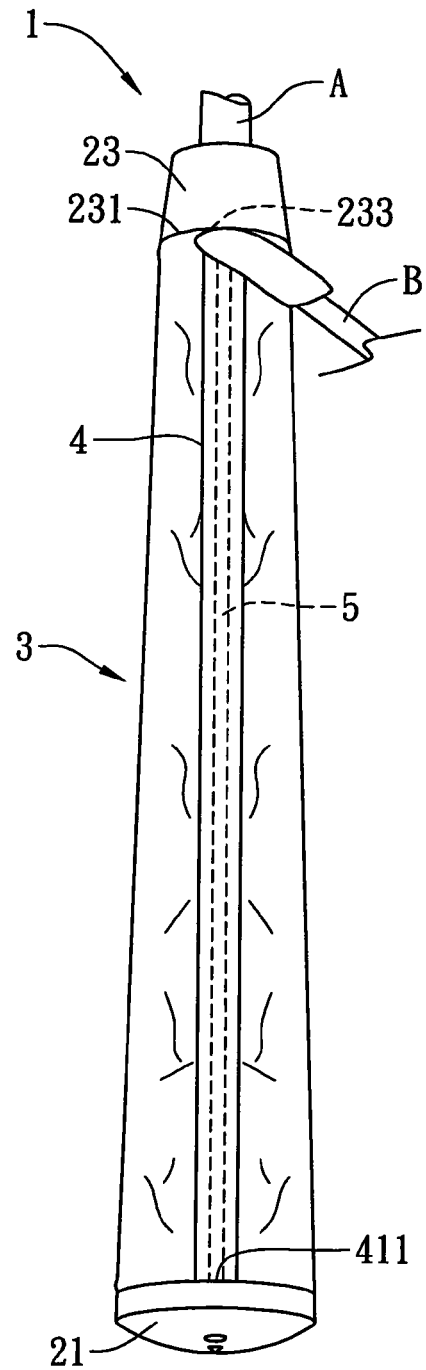
FIG. 16 illustrates a fourth finishing step of the first embodiment's assembly process.

The assembling golf club grip 1 with rod "A" is flipped over again for finishing the strip bottom end 42 of the axial seam strip 4 (referring to FIG. 16). The smooth and hard plate "B", like a butter knife blade, is used again to pull and curve the strip bottom end 42 inwardly underneath the flat retaining sidewall 233 of the protective rim 23 to form a fourth finishing 421 (referring to FIGS. 16, 17). Thus, the first embodiment of the golf club grip 1 of the present invention is completed as shown in FIG. 17.

Referring to the wrapping process (FIGS. 4 to 7), instead of using high adhesive glue (such as Polychloroprene adhesive or rubber adhesive), the use of the PSA 351 to adhere the single anti-slip sheet 3 onto the tubular sleeve body 22 is proved to be easier, faster, and with less mess and cleaning up, because it dries and adheres instantly without wasting time to dry. Thus, the object to make it easier and faster to fabricate the single sheet golf club grip 1 with less mess and cleaning up is accomplished.

Referring to the process of forming the axial seam structure (FIGS. 6, 7, 8, 9, 13, and 14), the liquid form Cyanoacrylate 54 flows in the axial gap 5 and rapidly bonds the two axial margins 33, 34 and the sleeve body 22 together. And the axial seam strip 4 tightly covers the axial gap 5 as a second secure binding. The axial gap 5 between the two axial margins 33, 34 will not be widely opened during the installation of the golf club grip 1 onto the larger end of the golf club shaft. Thus, the object to provide a stronger binding axial seam structure of the present invention is also accomplished.

The first finishing 312 and the third finishing 411 are formed along the cap underside edge 211 (FIGS. 12, 17). The second finishing 322 and the fourth finishing 421 are also formed along the retaining sidewall edge 231 (FIGS. 12, 17). These four fishing 312, 322, 411, 421 provide the golf club grip 1 in the first embodiment of the present invention with better appearance and accomplish the object of improving the good production rate in manufacturing.

If the single anti-slip sheet 3 is natural leather, the single anti-slip sheet 3 will be stretched and become hard due to the radial expansion of the golf club grip 1 after being mounted onto the larger end of the golf club shaft. It is better to modify the single anti-slip sheet 3 into a leather/foam layered single sheet 3' which has a natural leather sheet 61 as an outer layer and a closed-cell foam sheet 62 as a base layer. A modified golf club grip 8 with the leather/foam single sheet 3' is a second embodiment of the present invention shown in FIGS. 18 to 21.

Figure 3:
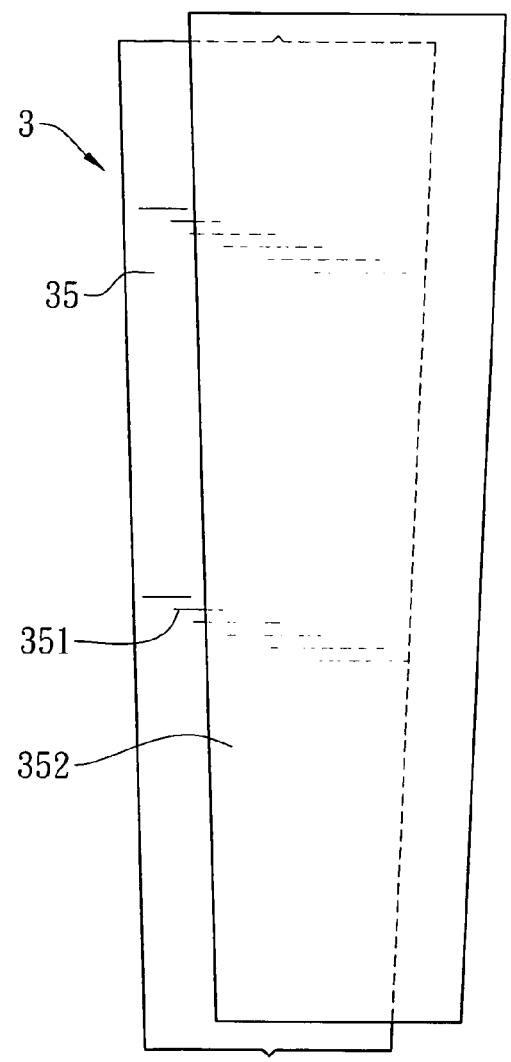
FIG. 3 is a back side prospective view of the single anti-slip sheet of the first embodiment.

The golf club grip 8 in the second embodiment has the same elements of the golf club grip 1 in the first embodiment except that the single anti-slip sheet 3 is modified to be the leather/foam single sheet 3' mentioned above. The natural leather outer layer can be selected from a group consisting of cowhide, calf skin, deer skin, sheep skin, pig skin, fish skin, snake skin, crocodile skin, and other animal skins. Its thickness is from 0.6 mm to 1.6 mm. The natural leather is cut into a predetermined dimension and shape of single leather sheet 61 like the single anti-slip sheet 3 (FIG. 3).

Figure 18:
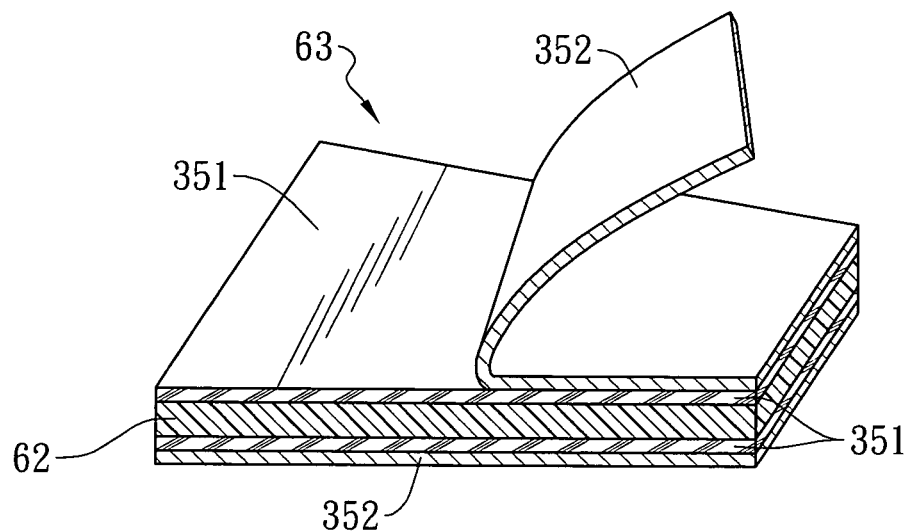
FIG. 18 is a cross sectional view of a PSA double-sided foam tape sheet for a leather/foam single sheet's foam material base layer.
Figure 19:
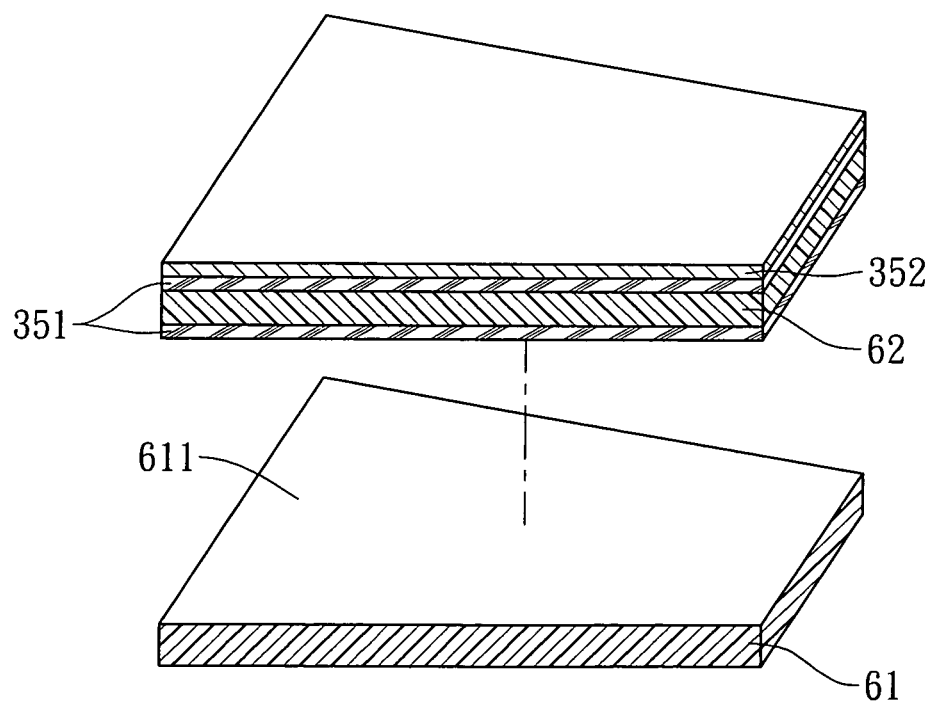
FIG. 19 illustrates a fabricating process of the leather/foam single sheet.

A PSA double-sided foam tape sheet 63 is cut from a sheeting material of a conventional PSA double-sided foam tape with its predetermined dimension and shape corresponding to the above single natural leather sheet 61 (referring to FIGS. 18,19). Its thickness is from 0.5 mm to 1.5 mm. The PSA double-sided foam tape sheet 63 has a closed-cell foam layer 62 of which both side have the PSA 351 protected with the releasing paper 352. The closed-cell foam layer 62 can be PU (Polyurethane) foam, EVA (ethylene vinyl acetate) foam, or EVA mixed with rubber (EVA/RB), or PE (Polyethylene) foam and the likes.

Figure 20:
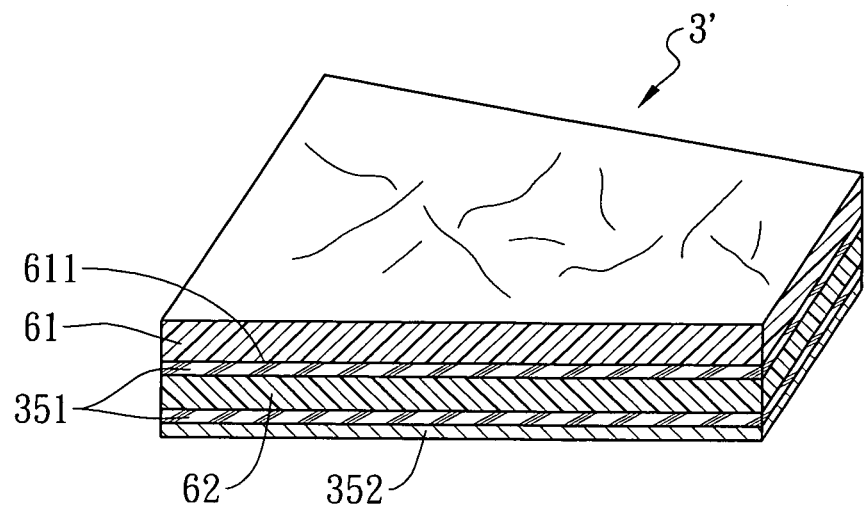
FIG. 20 is a cross sectional view of the leather/foam single sheet.

To fabricate the leather/foam single sheet 3', as shown in FIG. 18, the releasing paper 352 on one side of the PSA double-sided foam tape sheet 63 is peeled off. Having the corresponding dimension and shape, the closed-cell foam layer 62 is set and pressed to bond its PSA 351 with the natural leather sheet 61 together to form the leather/foam single sheet 3'. This fabricating process is shown in FIGS. 18 to 20. The thickness of the leather/foam single sheet 3' is from 1 mm to 2 mm, and preferably 1.5 mm.

Figure 21:
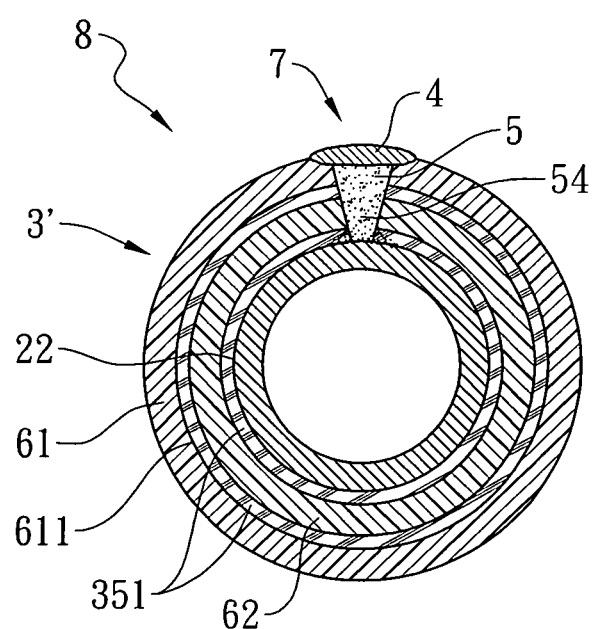
FIG. 21 is a cross sectional view of a second embodiment of the present invention.

To assemble the golf club grip 8 in the second embodiment, the same assembly process, as mentioned for fabricating the golf club grip 1 in the first embodiment shown from FIGS. 4 to 17, is used. And a cross sectional view of the second embodiment is shown in FIG. 21.

Having the closed-cell foam layer 62 as the base layer of the leather/foam single sheet 3', the golf club grip 8 in the second embodiment will not become hard after its installation onto the larger end of the golf club shaft. Thus, another object of the present invention to provide a single leather sheet golf club grip with a soft and cushion feel for user is accomplished.

Referring to FIGS. 22 to 40, a third embodiment of golf club grip 1' has a similar structure of the golf club grip 1 shown in the first embodiment except a modified inner sleeve 2'.

Figure 22:
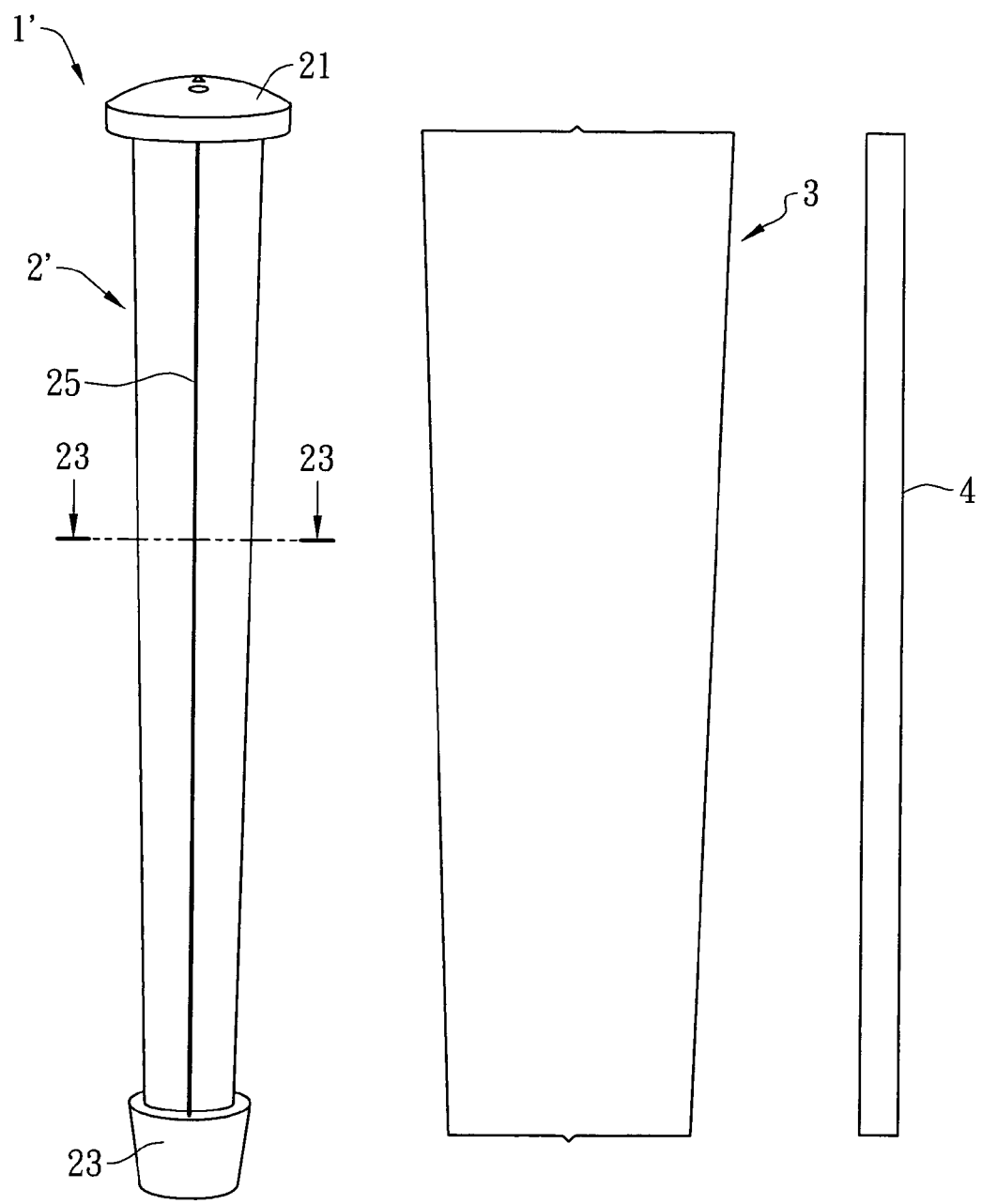
FIG. 22 is an exploded view of a third embodiment of the present invention.
Figure 23:
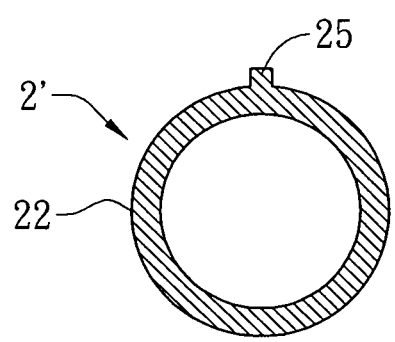
FIG. 23 is a cross sectional view of line 23-23 of FIG. 22.
Figure 24:
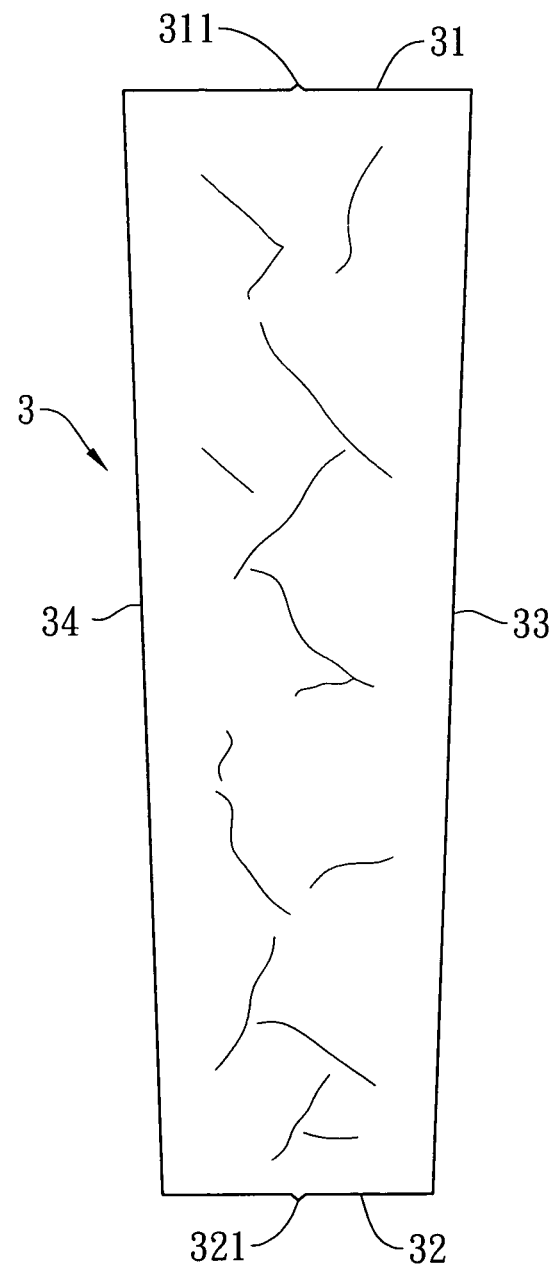
FIG. 24 is a front side prospective view of the third embodiment's single anti-slip sheet.

In addition to the same elements of the resilient inner sleeve 2, the modified resilient inner sleeve 2' includes an extra raised rib 25 projecting outwardly from the outer surface of the sleeve body 22 and extending from the cap 21 to the protective rim 23 (referring to FIGS. 22, 23). It has a height from the outer surface of the sleeve body 22 of about 0.2 mm to 0.6 mm (preferably 0.4 mm), and a width of about 0.2 mm to 0.8 mm (preferably 0.4 mm) which is axially connected with the outer surface of the sleeve body 22 between the cap 21 and the protective rim 23. And it is positioned right opposite to the position of the two central marks 212, 232 (not shown).

The raised rib 25 is used (a) to axially align and separate two axial margins 33, 34 to make the axial gap 5 straight, and (b) to bond the two axial margins 33, 34 together to enhance the bonding strength of the axial seam structure, which will be mentioned later.

Figure 25:
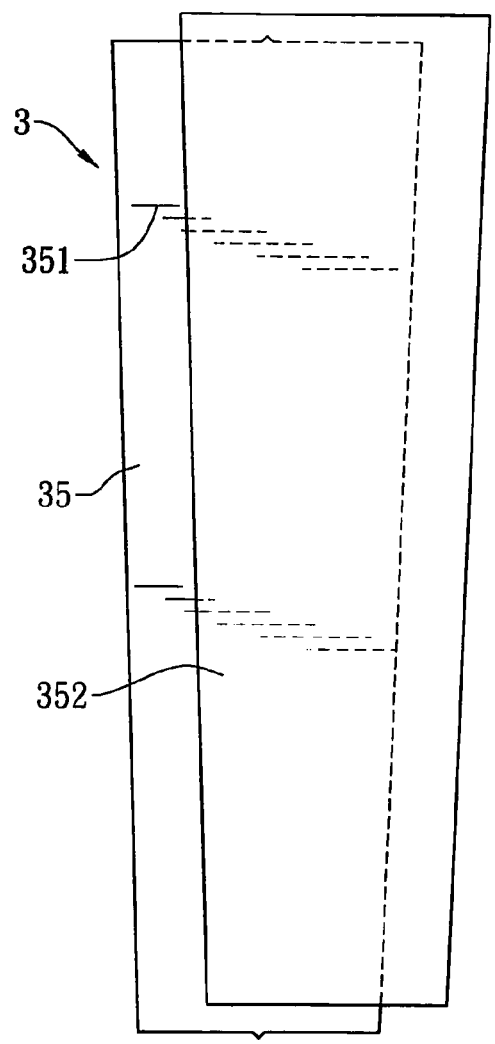
FIG. 25 is a back side prospective view of the third embodiment's single anti-slip sheet.
Figure 26:
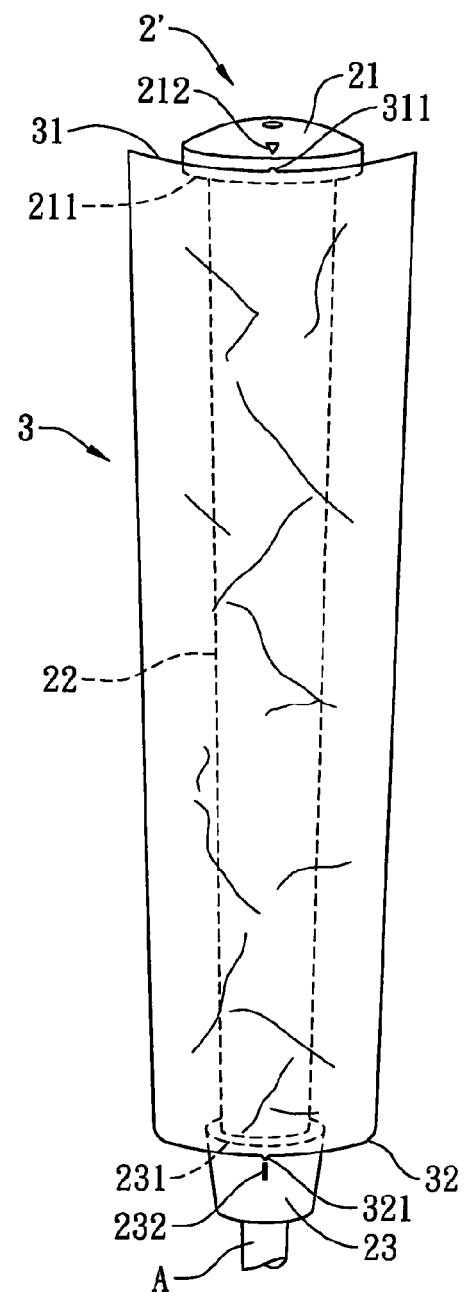
FIG. 26 illustrates a wrapping step of the third embodiment's assembly process.

In assembly, the inner sleeve 2' is mounted onto a supporting rod "A". The releasing paper 352 is peeled off from the back side 35 of the single anti-slip sheet 3 to expose the PSA 351 (as shown in FIG. 25). Referring to FIG. 26, the single anti-slip sheet 3 is aligned with the central marks 212/311 and 232/321 respectively, and then is set and pressed onto the sleeve body 22. The top circumferential margin 31 is over the cap underside edge 211 of the cap 21 for about 0.5 mm to 2 mm, and preferably 2 mm. Meanwhile, the bottom circumferential margin 32 is over the retaining sidewall edge 231 of the protective rim 23 for about 0.5 mm to 2 mm, and preferably 2 mm.

Figures 27, 28:
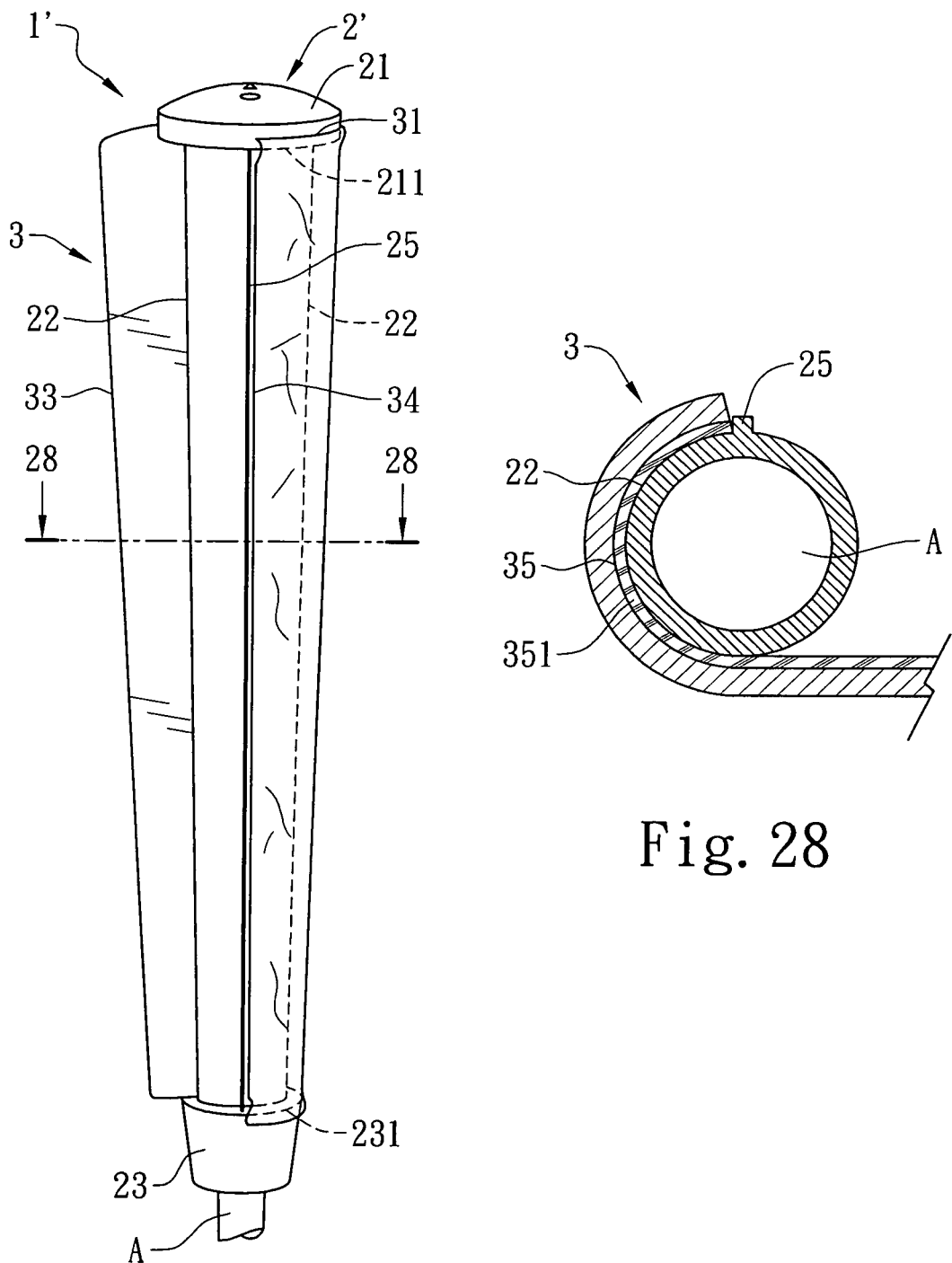
FIG. 27 illustrates another wrapping step of the third embodiment's assembly process.
FIG. 28 is a partial cross sectional view of line 28-28 of FIG. 27.
Figure 33:
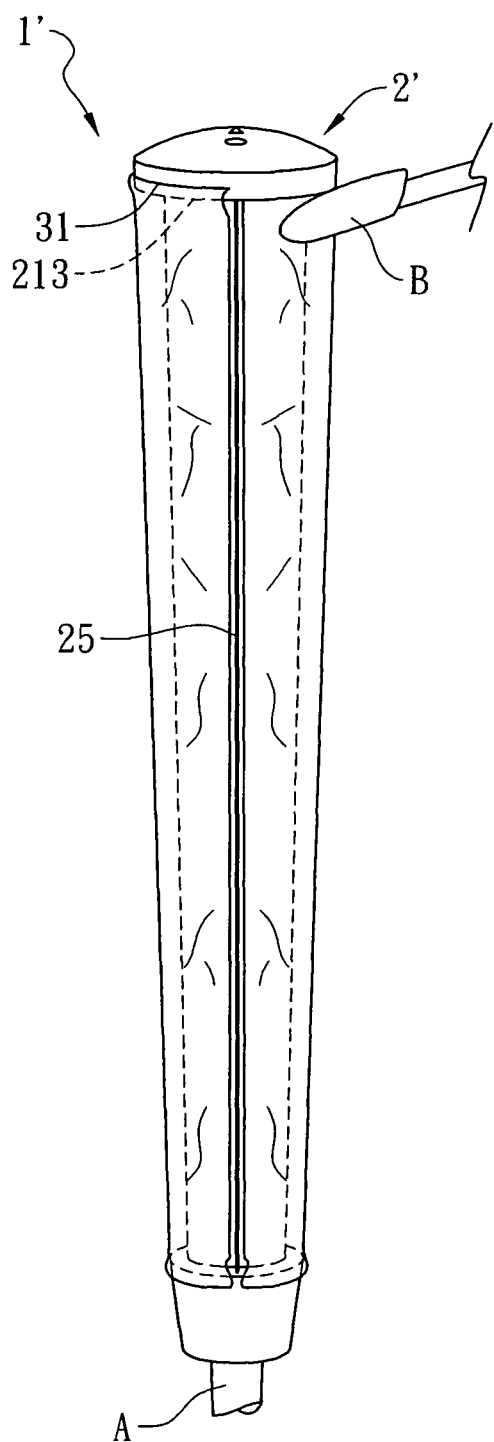
FIG. 33 illustrates the first finishing step of the third embodiment's assembly process.
Figure 34:
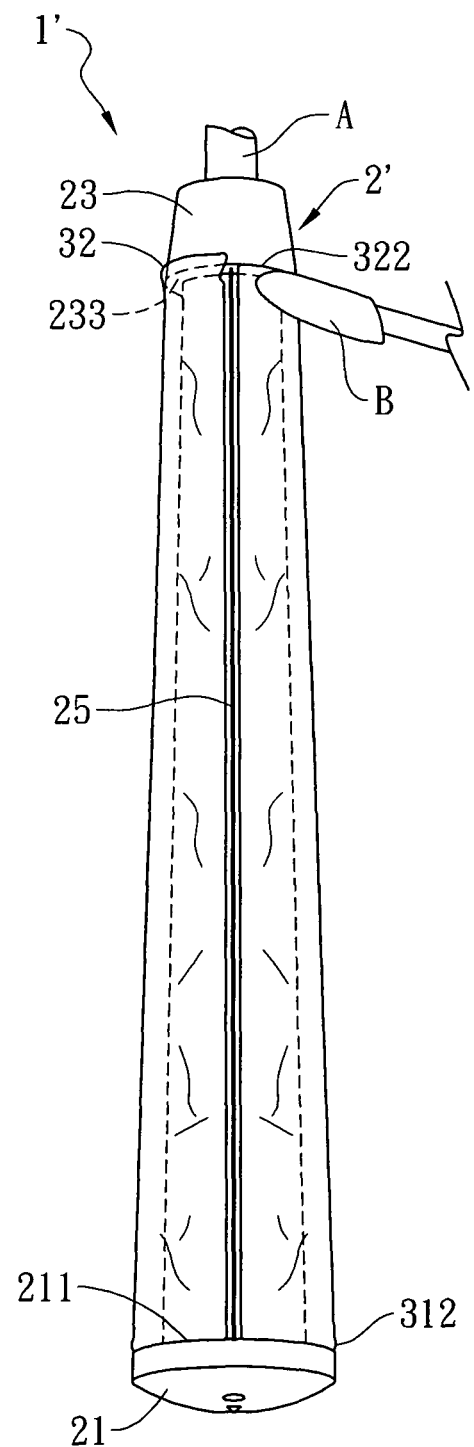
FIG. 34 illustrates the second finishing step of the third embodiment's assembly process.
Figure 35:
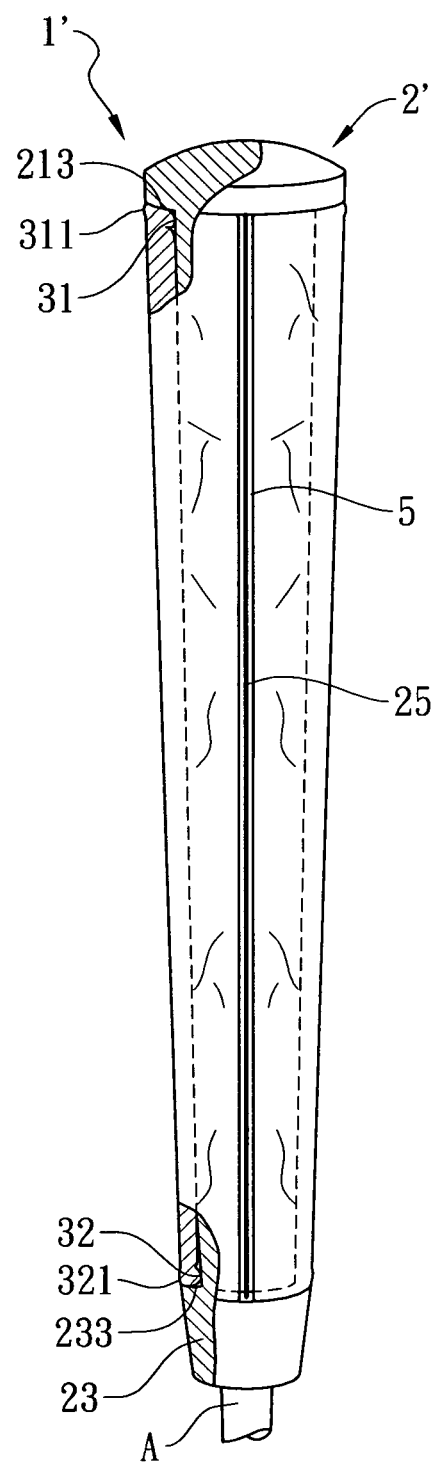
FIG. 35 is a partial sectional view of the third embodiment after the second finishing step of assembly process.

Referring to FIGS. 26 to 30, the single anti-slip sheet 3 is wrapped around and adhered onto the sleeve body 22 in such a way that the two axial margins 33, 34 respectively abut against the raised rib 25 (as shown in FIGS. 27, 28). The axial gap 5 is formed with a width of about 0.2 mm to 0.8 mm between the two axial margins 33, 34 and along the raised rib 25 (as shown in FIGS. 28, 29, 30).

For the golf club grip 1' in the third embodiment, the assembling processes, such as the process of applying Cyanoacrylate 54 (FIGS. 31,32), the process of forming the first/second finishing (FIGS. 33 to 35), the process of sealing the axial seam strip (FIGS. 36, 37), and the process of forming the third/fourth finishing (FIGS. 38, 39), are similar to those processes for fabricating the golf club grip 1 in the first embodiment as shown in FIG. 8 to FIG. 16.

Figures 36, 37:
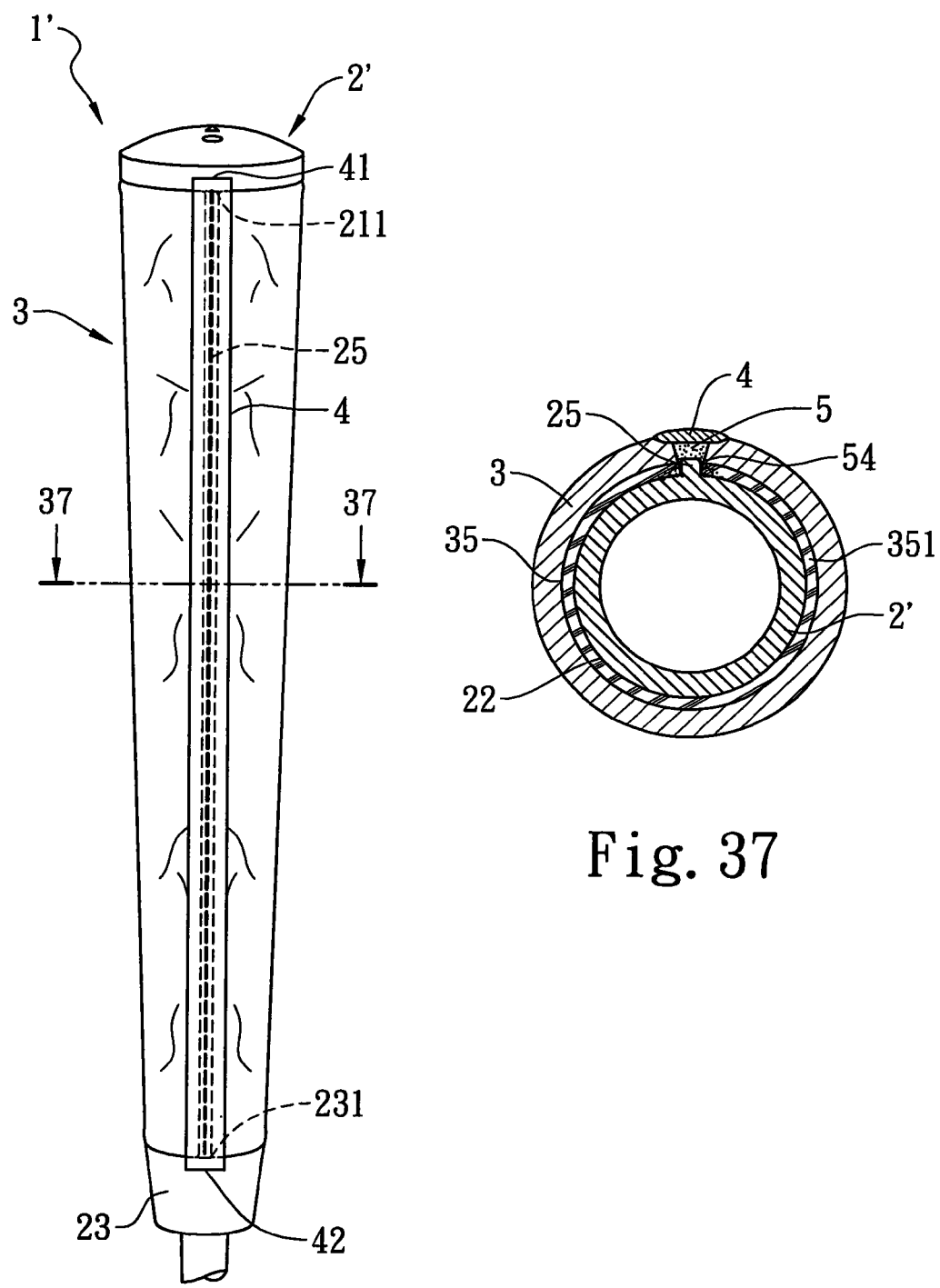
FIG. 36 illustrates a step of sealing axial seam strip in the third embodiment's assembly process.
FIG. 37 is a cross sectional view of line 37-37 of FIG. 36.
Figure 38:
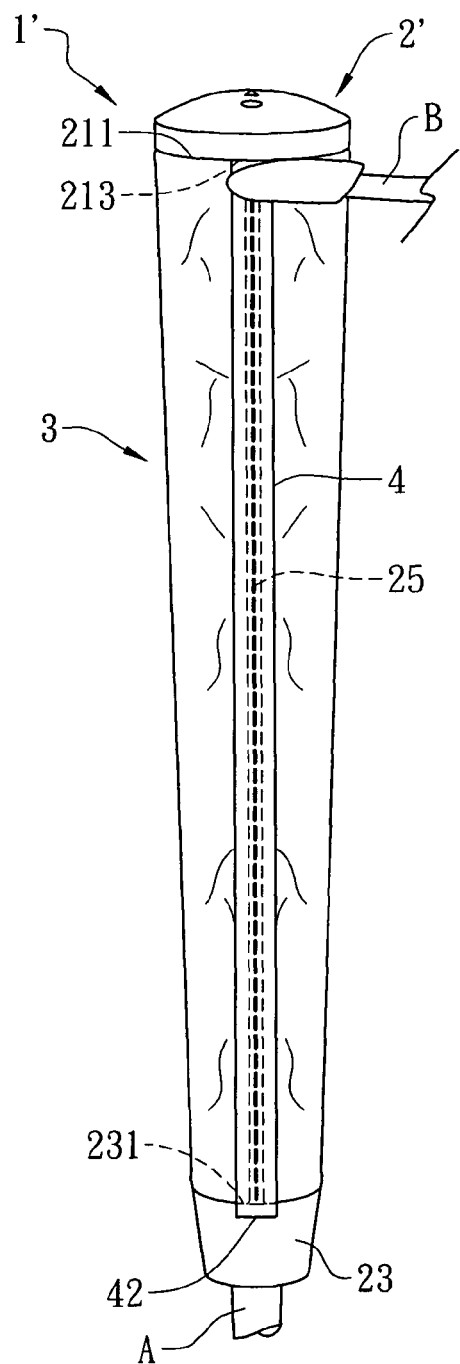
FIG. 38 illustrates the third finishing step of the third embodiment's assembly process.
Figure 39:
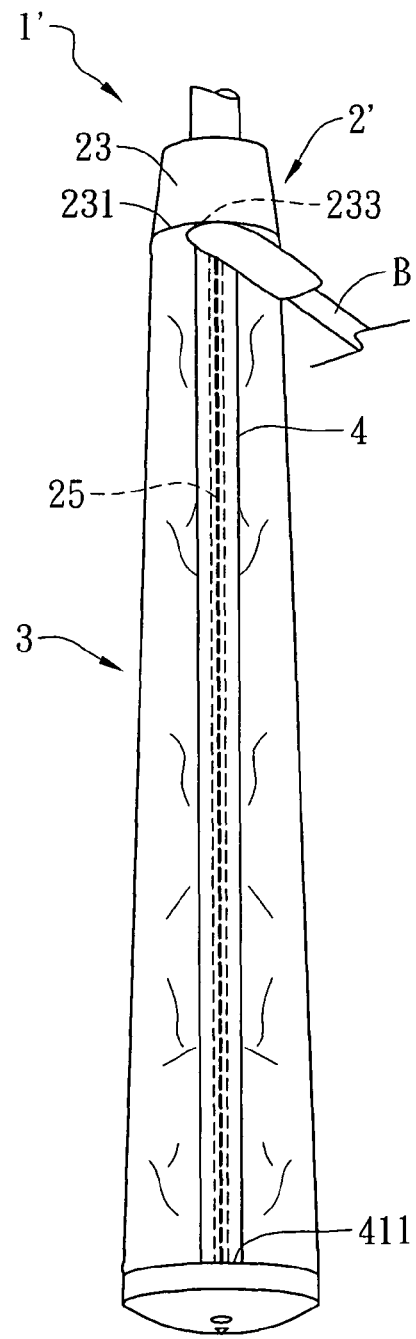
FIG. 39 illustrates the fourth finishing step of the third embodiment's assembly process.
Figure 40:
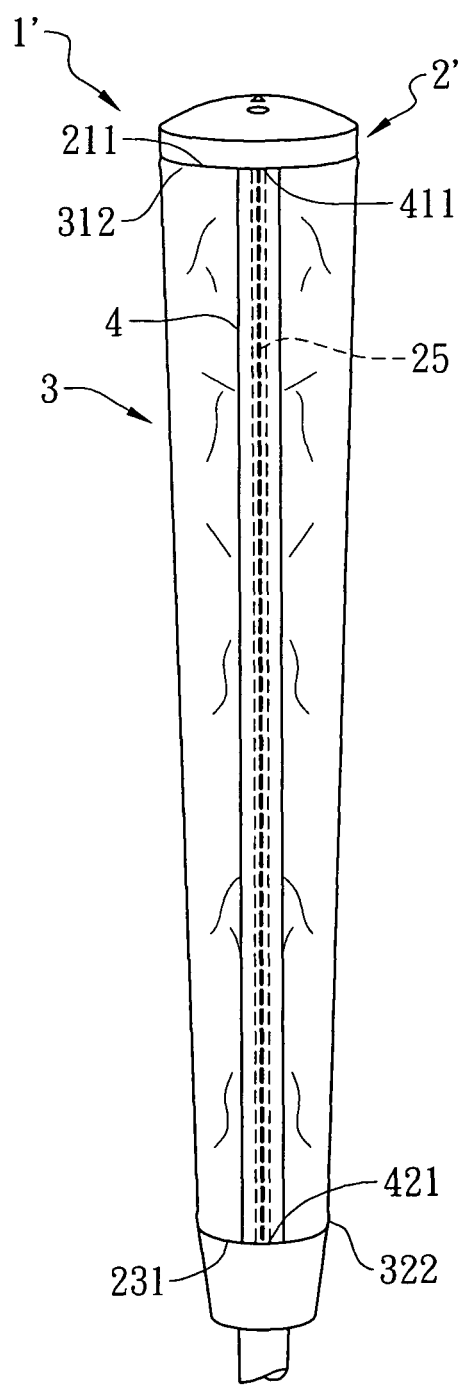
FIG. 40 is a prospective view of the third embodiment of the present invention.

The axial seam structure of the golf club grip 1' in the third embodiment has the raised rib 25 between the two axial margins 33, 34 shown in FIG. 37. Through above assembly processes (FIGS. 26 to 39), the golf club grip 1' in the third embodiment is completed as shown in FIG. 40.

Since the golf club grip 1' in the third embodiment has similar structure of the golf club grip 1 in the first embodiment, it has the same advantages of golf club grip 1 as mentioned above. On top of that, the raised rib 25 of the golf club grip 1' in the third embodiment can enhance (a) the straightness of the axial seam structure and (b) the bonding strength which is better than that of the golf club grip 1 in the first embodiment, because the raised rib 25 creates an extra bonding surface to bond the two axial margins 33, 34 and the sleeve body 22 together at the axial seam structure.

The golf club grip 8' in the fourth embodiment has the same elements of the golf club grip 1' in the third embodiment except that the single anti-slip sheet 3 is modified to be the leather/foam single sheet 3' (referring to FIGS. 41 to 44).

Figure 41:
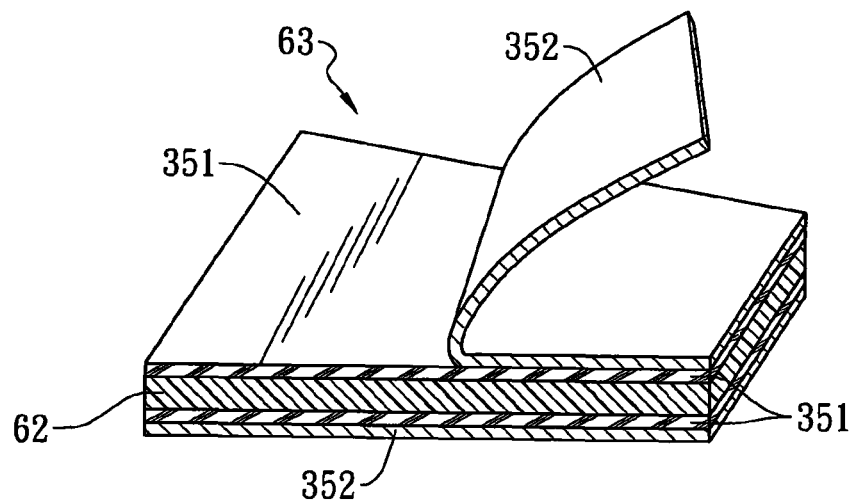
FIG. 41 is a cross sectional view of the PSA double-sided foam tape sheet for the leather/foam single sheet's foam material base layer.
Figure 42:
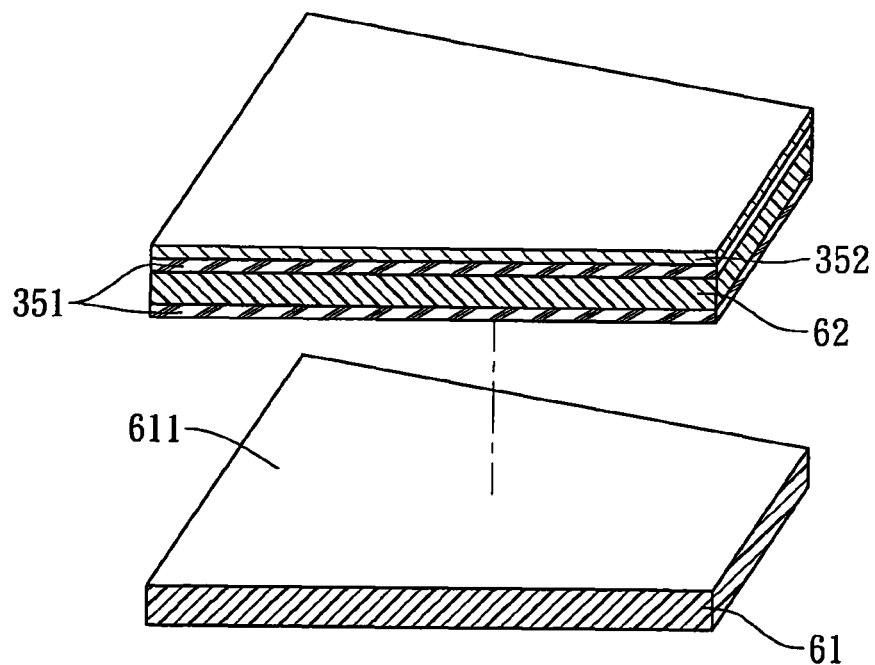
FIG. 42 illustrates the fabricating process of the leather/foam single sheet.
Figure 43:
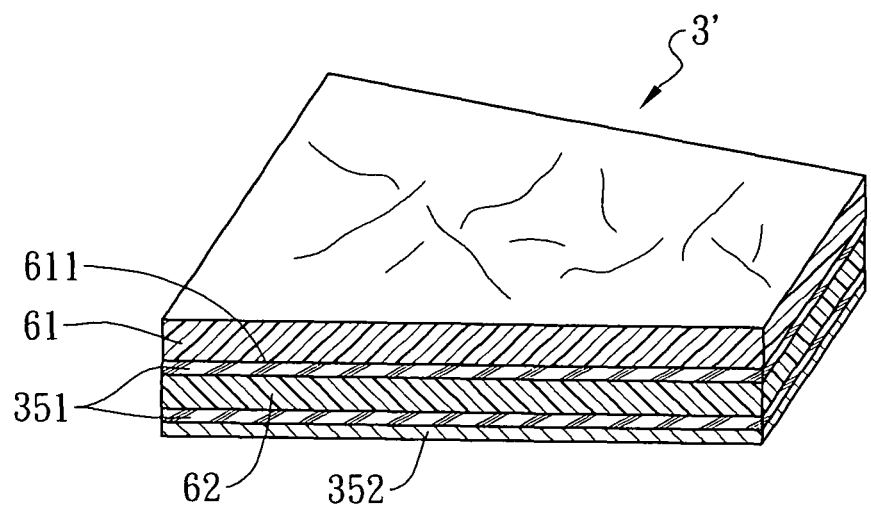
FIG. 43 is a cross sectional view of the single leather/foam sheet.
Figure 44:
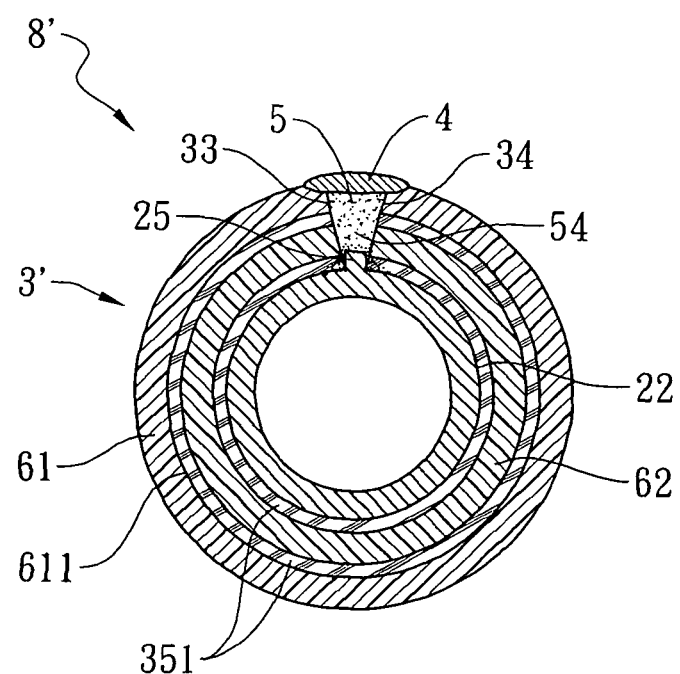
FIG. 44 is a cross sectional view of a fourth embodiment of the present invention.

Referring to FIGS. 41 to 43, the leather/foam single sheet 3' of the golf club grip 8' in the fourth embodiment has the same fabrication process for the golf club grip 8 in the second embodiment illustrated from FIGS. 18 to 20.

Since the golf club grip 8' in the fourth embodiment has the similar structure of the golf club grip 1' in the third embodiment, it is fabricated by the same assembly process for the golf club grip 1' in the third embodiment as illustrated from FIGS. 26 to 39 and it also has the same advantages of the golf club grip 1' in the third embodiment mentioned above.

Having the same leather/foam single sheet 3' of the golf club grip 8 as shown in the second embodiment, the golf club grip 8' in the fourth embodiment also has the same soft and cushion feel for the user.

It should be noted that in the above four embodiments, the single anti-slip sheet golf club grips 1, 1', 8, 8' could all be modified into a putter grip. This modification is done by replacing the inner sleeve 2, 2' with a different resilient inner sleeve which has a non-circular cross-sectional sleeve body with a flat front area (not shown). The configuration of the flat front area is in accordance with the design of most putters in general use.

The present invention has been described what are considered the most practical and preferred embodiments. It should be understood that this invention is not limited to the disclosed embodiments but is intended to cover various arrangements included within the spirit and scope of the broadest interpretation so as to encompass all such modifications and equivalent arrangements.

We claim:

1. A golf club grip, comprising:
    a resilient inner sleeve, which includes a tubular sleeve body having sleeve top and bottom ends, a cap projecting radially from said sleeve top end, a protective rim projecting radially from said sleeve bottom end, and a cavity configured to receive a larger end of a golf club shaft; a flat cap underside connected to said sleeve body and facing toward said protective rim, a cap underside edge being annularly at the distal end of said cap underside, a flat retaining sidewall connected to said sleeve body and facing toward said cap, and a retaining sidewall edge being annularly at the distal end of said retaining sidewall; and
    a single sheet, wrapped around and adhered onto said sleeve body; said single sheet having a top circumferential margin over said cap underside edge, a bottom circumferential margin over said retaining sidewall edge, two equal length axial margins respectively interconnecting with said top circumferential margin and said bottom circumferential margin, and a dimension longitudinally narrower than a dimension of said sleeve body's outer surface to form an axial gap between said two axial margins from said cap to said protective rim;

a combination of adhesives including a Pressure Sensitive Adhesive used to adhere said single sheet onto said sleeve body, and a structural adhesive applied in said axial gap from a first point to a second point in said axial gap;

wherein the first point is a point away from said cap toward said protective rim in said axial gap;

wherein the second point is a point away from said protective rim toward said cap in said gap;

wherein said top circumferential margin of said single sheet is curved inwardly to form a first finishing along said cap underside edge;

wherein said bottom circumferential margin of said single sheet is curved inwardly to form a second finishing along said retaining sidewall edge; and an axial seam strip, covering said axial gap and bonded onto each of the two axial margins along said axial gap from said cap to said protective rim to form an axial seam structure;

wherein said axial seam strip has a first strip end over said cap underside edge, and a second strip end over said retaining sidewall edge;

wherein said first strip end is curved inwardly at the meet of said first finishing and said axial seam strip near to said cap to form a third finishing;

wherein said second strip end is curved inwardly at the meet of said second finishing and said axial seam strip near to said protective rim to form a fourth finishing.

2. The golf club grip as claimed in claim 1, wherein said resilient inner sleeve is made of a material selected from a group consisting of rubber, rubber compounds, thermoplastic elastomer (TPE), thermoplastic rubber (TPR), elastomers, and closed-cell foams of plastics or rubbers.

3. The golf club grip as claimed in claim 1, wherein said single sheet is selected from a group consisting of PU (Polyurethane) leather, PU wet type leather, PU/foam leathers, synthetic leather, natural leathers, and leather/foam layered materials.

4. The golf club grip as claimed in claim 1, wherein said single sheet has a thickness of about 0.6 mm to 2 mm.

5. The golf club grip as claimed in claim 4, wherein said top circumferential margin is over said cap underside edge for about 0.5 mm to 2 mm, and said bottom circumferential margin is over said retaining sidewall edge for about 0.5 mm to 2 mm.

6. The golf club grip as claimed in claim 1, wherein said axial gap has a width of about 0.2 mm to 0.8 mm between said two axial margins, whereby said structural adhesive is applied in said axial gap to bond said two axial margins and said sleeve body together.

7. The golf club grip as claimed in claim 6, wherein the first point is a point about 1 mm to 3 mm away from said cap toward said protective rim in said axial gap, and the second point is a point about 1 mm to 3 mm away from said protective rim toward said cap in said axial gap;

whereby said first finishing and third finishing are formed along said cap underside edge, and said second finishing and fourth finishing are formed along said retaining sidewall edge of said protective rim.

8. The golf club grip as claimed in claim 1, wherein said structural adhesive is an adhesive that hardens via a process of evaporation of solvent or of chemical reaction to form a permanent bond.

9. The golf club grip as claimed in claim 8, wherein said structural adhesive is Cyanoacrylate.

10. The golf club grip as claimed in claim 1, wherein said first and third finishing abut against said cap underside.

11. The golf club grip as claimed in claim 1, wherein said axial seam strip is selected from a group consisting of Polyurethane and natural leathers.

12. The golf club grip as claimed in claim 11, wherein said axial seam strip has a thickness of 0.2 mm to 0.6 mm, and a width of 4 mm to 8 mm from said first strip end to said second strip end;

whereby said axial strip covers said axial gap and is bonded onto each of said two axial margins along said axial gap from said first finishing to said second finishing to form said axial seam structure.

13. The golf club grip as claimed in claim 12, wherein said first strip end is over said cap underside edge for about 0.5 mm to 2 mm, and said second strip end is over said retaining sidewall edge for about 0.5 mm to 2 mm, whereby said third finishing and fourth finishing are formed respectively.

14. The golf club grip as claimed in claim 1, wherein said second and fourth finishing abut against said retaining sidewall.

15. The golf club grip as claimed in claim 1, wherein said single sheet is a leather/foam single sheet having a natural leather as an outer layer and a closed-cell foam material as a base layer;

whereby the leather/foam single sheet golf club grip has a soft and cushion feel for the user after the leather/foam single sheet golf club grip is mounted onto the larger end of the golf club shaft.

16. The golf club grip as claimed in claim 15, wherein said natural leather outer layer is selected from a group consisting of cowhide, calf skin, deer skin, sheep skin, pig skin, snake skin, crocodile skin, and fish skin.

17. The golf club grip as claimed in claim 16, wherein said natural leather outer layer has a thickness from 0.6 mm to 1.6 mm.

18. The golf club grip as claimed in claim 15, wherein said closed-cell foam material base layer is selected from a group consisting of EVA (ethylene vinyl acetate) foam, PE (Polyethylene), and PU (Polyurethane) foam.

19. The golf club grip as claimed in claim 18, wherein said foam material base layer has a thickness from 0.5 mm to 1.5 mm.

20. A golf club grip, comprising:

a resilient inner sleeve, which includes a tubular sleeve body having sleeve top and bottom ends, a cap projecting radially from said sleeve top end, a protective rim projecting radially from said sleeve bottom end, and a cavity configured to receive a larger end of a golf club shaft; a flat cap underside connected to said sleeve body and facing toward said protective rim, a cap underside edge being annularly at the distal end of said cap underside, a flat retaining sidewall connected to said sleeve body and facing toward said cap, a retaining sidewall edge being annularly at the distal end of said retaining sidewall, and a raised rib projecting outwardly from an outer surface of said sleeve body and extending from said cap to said protective rim;

a single sheet, wrapped around and adhered onto said sleeve body; said single sheet having a top circumferential margin over said cap underside edge, a bottom circumferential margin over said retaining sidewall edge, and two equal length axial margins respectively interconnecting with said top circumferential margin and said bottom circumferential margin, where each of said two axial margins respectively abuts against said raised rib from said cap to said protective rim to form an axial gap;

a combination of adhesives including a Pressure Sensitive Adhesive used to adhere said single sheet onto said sleeve body, and a structural adhesive applied in said axial gap from a first point to a second point in said axial gap;

wherein the first point is a point away from said cap toward said protective rim in said axial gap;

wherein the second point is a point away from said protective rim toward said cap in said axial gap;

wherein said top circumferential margin of said single sheet is curved inwardly to form a first finishing along said cap underside edge;

wherein said bottom circumferential margin of said single sheet is curved inwardly to form a second finishing along said retaining sidewall edge;

an axial seam strip, covering said axial gap and bonded onto each of said two axial margins along said axial gap from said cap to said protective rim to form an axial seam structure;

wherein said axial seam strip has a first strip end over said cap underside edge, and a second strip end over said retaining sidewall edge;

wherein said first strip end is curved inwardly at the meet of said first finishing and said seam strip near to said cap to form a third finishing;

wherein said second strip end is curved inwardly at the meet of said second finishing and said seam strip near to said protective rim to form a fourth finishing.

21. The golf club grip as claimed in claim 20, wherein said resilient inner sleeve is made of a material selected from a group consisting bf rubber, rubber compounds, thermoplastic elastomer (TPE), thermoplastic rubber (TPR), elastomers, and closed-cell foams of plastics or rubbers.

22. The golf club grip as claimed in claim 20, wherein said raised rib has a height of 0.2 mm to 0.6 mm from said sleeve body's outer surface, and a width from 0.2 mm to 0.8 mm connected with said sleeve body's outer surface from said cap to said protective rim;

whereby said axial gap is straight aligned and formed.

23. The golf club grip as claimed in claim 20, wherein said single sheet is selected from a group consisting of PU (Polyurethane) leather, PU wet type leather, PU/foam leather, synthetic leather, natural leather, and leather/foam layered materials.

24. The golf club grip as claimed in claim 23, wherein said single sheet has a thickness of about 0.6 mm to 2 mm.

25. The golf club grip as claimed in claim 24, wherein said top circumferential margin is over said cap underside edge for about 0.5 mm to 2 mm, and said bottom circumferential margin is over said retaining sidewall edge for about 0.5 to 2 mm.

26. The golf club grip as claimed in claim 20, wherein said axial gap has a width of about 0.2 mm to 0.8 mm between said two axial margins;

whereby said structural adhesive is applied in said axial gap to bond said two axial margins and said sleeve body together.

27. The golf club grip as claimed in claim 26, wherein the first point is a point about 1 mm to 3 mm away from said cap toward said protective rim in said axial gap, and the second point is a point about 1 mm to 3 mm away from said protective rim toward said cap in said axial gap;

whereby said first finishing and third finishing are formed along said cap underside edge, and said second finishing and fourth finishing are formed along said retaining sidewall edge of said protective rim.

28. The golf club grip as claimed in claim 20, wherein said structural adhesive is an adhesive that hardens via a process of evaporation of solvent or of chemical reaction to form a permanent bond.

29. The golf club grip as claimed in claim 28, wherein said structural adhesive is Cyanoacrylate.

30. The golf club grip as claimed in claim 20, wherein said first and third finishing abut against said cap underside.

31. The golf club grip as claimed in claim 20, wherein said axial seam strip is selected from a group consisting of Polyurethane and natural leathers.

32. The golf club grip as claimed in claim 31, wherein said axial seam strip has a thickness from 0.2 mm to 0.6 mm, and a width from 4 mm to 8 mm from said first strip end to said second strip end;

whereby said axial strip covers said axial gap and is bonded onto each of said two axial margins along said axial gap from said first finishing to said second finishing to form said axial seam structure.

33. The golf club grip as claimed in claim 32, wherein said first strip end is over said cap underside edge for about 0.5 mm to 2 mm, and said second strip end is over said retaining sidewall edge for about 0.5 mm to 2 mm;

whereby said third finishing and fourth finishing are formed respectively.

34. The golf club grip as claimed in claim 20, wherein said second and fourth finishing abut against said retaining sidewall of said protective rim.

35. The golf club grip as claimed in claim 20, wherein said single sheet is a leather/foam single sheet having a natural leather as an outer layer and a closed-cell foam material as a base layer;

whereby the leather/foam single sheet golf club grip has a soft and cushion feel for the user after it is mounted onto the larger end of the golf club shaft.

36. The golf club grip as claimed in claim 35, wherein said natural leather outer layer is selected from a group consisting of cowhide, calf skin, deer skin, sheep skin, pig skin, snake skin, crocodile skin, and fish skin.

37. The golf club grip as claimed in claim 36, wherein said natural leather outer layer has a thickness from 0.6 mm to 1.6 mm.

38. The golf club grip as claimed in claim 35, wherein said closed-cell foam material base layer is selected from a group consisting of EVA (ethylene vinyl acetate) foam, PE (Polyethylene), and PU (Polyurethane) foam.

39. The golf club grip as claimed in claim 38, wherein said closed-cell foam material base layer has a thickness from 0.5 mm to 1.5 mm.

40. A method of making a golf club grip for the handle of a golf club, comprising steps of:

Providing a resilient inner sleeve, which includes a tubular sleeve body having sleeve top and bottom ends, a cap projecting radially from said sleeve top end, a protective rim projecting radially from said sleeve bottom end, and a cavity configured to receive a larger end of a golf club shaft; a flat cap underside connected to said sleeve body and facing toward said protective rim, a cap underside edge being annularly at the distal end of said cap underside, a flat retaining sidewall connected to said sleeve body and facing toward said cap, and a retaining sidewall edge being annularly at the distal end of said retaining sidewall; and providing a single sheet, wrapped around and adhered onto said sleeve body, said single sheet having a top circumferential margin over said cap underside edge, a bottom circumferential margin over said retaining sidewall edge, two equal length axial margins respectively interconnecting with said top circumferential margin and said bottom circumferential margin, and a dimension longitudinally narrower than a dimension of said sleeve body's outer surface to form an axial gap between said two axial margins from said cap to said protective rim;

providing a combination of adhesives including a Pressure Sensitive Adhesive used to adhere said single sheet onto said sleeve body, and a structural adhesive applied in said axial gap from a first point to a second point in said axial gap;

wherein the first point is a point away from said cap toward said protective rim in said axial gap;

wherein the second point is a point away from said protective rim toward said cap in said gap;

curving said top circumferential margin of said single sheet inwardly to form a first finishing along said cap underside edge;

curving said bottom circumferential margin of said single sheet inwardly to form a second finishing along said retaining sidewall edge;

providing an axial seam strip, covering said axial gap and bonded onto each of said two axial margins along said axial gap from said cap to said protective rim to form an axial seam structure;

wherein said seam strip has a first strip end over said cap underside edge, and a second strip end over said retaining sidewall edge;

curving said first strip end inwardly at the meet of said first finishing and said axial seam strip near to said cap to form a third finishing; and curving said second strip end inwardly at the meet of said second finishing and said axial seam strip near to said protective rim to form a fourth finishing.

41. The method as claimed in claim 40, wherein said top circumferential margin is over said cap underside edge for about 0.5 mm to 2 mm and said bottom circumferential margin is over said retaining sidewall edge for about 0.5 mm to 2 mm.

42. The method as claimed in claim 40, wherein said axial gap has a width of about 0.2 mm to 0.8 mm between said two axial margins;

whereby said structural adhesive is applied in said axial gap to bond said two axial margins and said sleeve body together.

43. The method as claimed in claim 42, wherein the first point is a point about 1 mm to 3 mm away from said cap toward said protective rim in said axial gap, and the second point is a point about 1 mm to 3 mm away from said protective rim toward said cap in said axial gap;

whereby said first finishing and third finishing are formed along said cap underside edge, and said second finishing and fourth finishing are formed along said retaining sidewall edge of said protective rim.

44. The method as claimed in claim 40, wherein said structural adhesive is an adhesive that hardens via a process of evaporation of solvent or of chemical reaction to form a permanent bond.

45. The method as claimed in claim 44, wherein said structural adhesive is Cyanoacrylate.

46. The method as claimed in claim 40, wherein said first strip end is over said cap underside edge for about 0.5 mm to 2 mm, and said second strip end is over said retaining sidewall edge for about 0.5 mm to 2 mm;

whereby said third finishing and fourth finishing are formed respectively.

47. The method as claimed in claim 40, wherein said single sheet is a leather/foam single sheet having a natural leather as an outer layer and a closed-cell foam material as a base layer;

whereby the leather/foam single sheet golf club grip has a soft and cushion feel for the user after the leather/foam single sheet golf club grip is mounted onto the larger end of the golf club shaft.

48. A method of making a grip for the handle of a golf club, comprising steps of:

providing a resilient inner sleeve, which includes a tubular sleeve body having sleeve top and bottom ends, a cap projecting radially from said sleeve top end, a protective rim projecting radially from said sleeve bottom end, and a cavity configured to receive a larger end of a golf club shaft; a flat cap underside connected to said sleeve body and facing toward said protective rim, a cap underside edge being annularly at the distal end of said cap underside, a flat retaining sidewall connected to said sleeve body and facing toward said cap, a retaining sidewall edge being annularly at the distal end of said retaining sidewall, and a raised rib projecting outwardly from said outer surface of said sleeve body and extending from said cap to said protective rim; and providing a single sheet, wrapped around and adhered to said sleeve body; said single sheet having a top circumferential margin over said cap underside edge, a bottom circumferential margin over said retaining sidewall edge, two equal length axial margins respectively interconnecting with said top circumferential margin and said bottom circumferential margin, where each of said two axial margins respectively abuts against said raised rib to form an axial gap from said cap to said protective rim;

providing a combination of adhesives having a Pressure Sensitive Adhesive used to adhere said single sheet onto said sleeve body, and a structural adhesive applied in said axial gap from a first point to a second point in said axial gap;

wherein the first point is a point away from said cap toward said protective rim in said axial gap;

wherein the second point is a point away from said protective rim toward said cap in said gap;

curving said top circumferential margin of said single sheet inwardly to form a first finishing along said cap underside edge;

curving said bottom circumferential margin of said single sheet inwardly to form a second finishing along said retaining sidewall edge;

providing an axial seam strip, covering said axial gap and bonded onto each of said two axial margins along said axial gap from said cap to said protective rim to form an axial seam structure;

wherein said seam strip has a first strip end over said cap underside edge and a second strip end over said retaining sidewall edge;

curving said first strip end inwardly at the meet of said first finishing and said seam strip near to said cap to form a third finishing; and curving said second strip end inwardly at the meet of said second finishing and said seam strip near to said protective rim to form a fourth finishing.

49. The method as claimed in claim 48, wherein said top circumferential margin is over said cap underside edge for about 0.5 mm to 2 mm, and said bottom circumferential margin is over said retaining sidewall edge for about 0.5 to 2 mm.

50. The method as claimed in claim 48, wherein said axial gap has a width from 0.2 mm to 0.8 mm between said two axial margins; whereby said structural adhesive is applied in said gap to bond said two axial margins and said sleeve body together.

51. The method as claimed in claim 50, wherein the first point is a point about 1 mm to 3 mm away from said cap toward said protective rim in said axial gap, and the second point is a point about 1 mm to 3 mm away from said protective rim toward said cap in said axial gap;
  whereby said first finishing and third finishing are formed along said cap underside edge, and said second finishing and fourth finishing are formed along said retaining sidewall edge of said protective rim.

52. The method as claimed in claim 48, wherein said structural adhesive is an adhesive that hardens via a process of evaporation of solvent or of chemical reaction to form a permanent bond.

53. The method as claimed in claim 52, wherein said structural adhesive is Cyanoacrylate.

54. The method as claimed in claim 48, wherein said first strip end is over said cap underside edge for about 0.5 mm to 2 mm and said second strip end is over said retaining sidewall edge for about 0.5 mm to 2 mm;
  whereby said third finishing and fourth finishing are formed respectively.

55. The method as claimed in claim 48, wherein said single sheet is a leather/foam single sheet having a natural leather as an outer layer and a closed-cell foam material as a base layer;
  whereby the leather/foam single sheet golf club grip has a soft and cushion feel for the user after the leather/foam single sheet golf club grip is mounted onto the larger end of the golf club shaft.

* * * * *